(12) United States Patent
Li et al.

(10) Patent No.: US 11,159,966 B2
(45) Date of Patent: Oct. 26, 2021

(54) METHOD FOR MEASURING SERVICE TRANSMISSION STATUS OF USER EQUIPMENT AND SERVICE STATION

(71) Applicant: Huawei Technologies Co., Ltd., Shenzhen (CN)

(72) Inventors: Bingzhao Li, Beijing (CN); Yanyan Chen, Shenzhen (CN); Xiaodong Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 44 days.

(21) Appl. No.: 16/803,670

(22) Filed: Feb. 27, 2020

(65) Prior Publication Data

US 2020/0236567 A1   Jul. 23, 2020

Related U.S. Application Data

(63) Continuation of application No. 15/148,962, filed on May 6, 2016, now Pat. No. 10,602,386, which is a (Continued)

(51) Int. Cl.
*H04W 24/08* (2009.01)
*H04W 24/10* (2009.01)
(Continued)

(52) U.S. Cl.
CPC ........... *H04W 24/08* (2013.01); *H04W 24/10* (2013.01); *H04W 28/02* (2013.01); *H04W 88/02* (2013.01); *H04W 88/08* (2013.01); *H04W 92/20* (2013.01)

(58) Field of Classification Search
None
See application file for complete search history.

(56) References Cited

U.S. PATENT DOCUMENTS

2011/0211827 A1   9/2011  Soto et al.
2012/0307774 A1   12/2012 Zhao et al.
(Continued)

FOREIGN PATENT DOCUMENTS

CN   102149106 A   8/2011
CN   103249078 A   8/2013
(Continued)

OTHER PUBLICATIONS

"3rd Generation Partnership Project;Technical Specification Group Services and System Aspects;Telecommunication management;Subscriber and equipment trace;Trace concepts and requirements(Release 9)," 3GPP TS 32.421 V9.2.0, total 29 pages, 3rd Generation Partnership Project, Valbonne, France (Jun. 2013).
(Continued)

*Primary Examiner* — Shripal K Khajuria
(74) *Attorney, Agent, or Firm* — Leydig, Voit & Mayer, Ltd.

(57) ABSTRACT

A method and system for measuring a service transmission status of a user equipment is provided. A first service station transmits a first data packet for a user equipment; the first service station determines at least one second service station that transmits a second data packet for the user equipment; and the first service station instructs the at least one second service station to measure a service transmission status of the user equipment, where the first data packet and the second data packet are different data packets of a same service of the user equipment or data packets of different services. According to the method and system, a service transmission status of a user equipment can be measured in a multi-station transmission scenario.

8 Claims, 11 Drawing Sheets

Related U.S. Application Data continuation of application No. PCT/CN2013/086703, filed on Nov. 7, 2013.

(51) Int. Cl.
  *H04W 28/02* (2009.01)
  *H04W 92/20* (2009.01)
  *H04W 88/02* (2009.01)
  *H04W 88/08* (2009.01)

(56) References Cited

U.S. PATENT DOCUMENTS

| | | | |
|---|---|---|---|
| 2013/0163497 A1 | 6/2013 | Wei | |
| 2013/0176988 A1 | 7/2013 | Wang et al. | |
| 2014/0086094 A1* | 3/2014 | Keskitalo | H04W 24/10 370/252 |
| 2014/0204771 A1 | 7/2014 | Gao et al. | |
| 2014/0233408 A1 | 8/2014 | Bontu et al. | |
| 2014/0357297 A1* | 12/2014 | Futaki | H04W 64/00 455/456.1 |
| 2015/0109939 A1 | 4/2015 | Schmidt et al. | |
| 2015/0201339 A1 | 7/2015 | Yi et al. | |
| 2015/0289156 A1* | 10/2015 | Jung | H04W 24/10 370/252 |
| 2015/0341838 A1 | 11/2015 | Pinheiro et al. | |
| 2016/0192339 A1 | 6/2016 | Axmon et al. | |

FOREIGN PATENT DOCUMENTS

| | | |
|---|---|---|
| WO | 2012095113 A1 | 7/2012 |
| WO | 2012152312 A1 | 11/2012 |
| WO | 2012152315 A1 | 11/2012 |
| WO | 2013001333 A1 | 1/2013 |

OTHER PUBLICATIONS

"3rd Generation Partnership Project;Technical Specification Group Radio Access Network; Evolved Universal Terrestrial Radio Access (E-UTRA);Radio Resource Control (RRC);Protocol specification(Release 11)," 3GPP TS 36.331 V11.5.0, total 347 pages, 3rd Generation Partnership Project, Valbonne, France (Sep. 2013).

"3rd Generation Partnership Project;Technical Specification Group Radio Access Network; Evolved Universal Terrestrial Radio Access Network(E-UTRAN);S1 Application Protocol (S1AP)(Release 11)," 3GPP TS 36.413 V11.5.0, total 274 pages, 3rd Generation Partnership Project, Valbonne, France (Sep. 2013).

"3rd Generation Partnership Project;Technical Specification Group Radio Access Network; Evolved Universal Terrestrial Radio Access Network (E-UTRAN);S1 data transport(Release 11),"3GPP TS 36.414 V11.0.0, total 8 pages, 3rd Generation Partnership Project, Valbonne, France (Sep. 2012).

"3rd Generation Partnership Project;Technical Specification Group Radio Access Network; Evolved Universal Terrestrial Radio Access Network (E-UTRAN);X2 application protocol (X2AP)(Release 10)," 3GPP TS 36.423 V10.7.0 total 132 pages, 3rd Generation Partnership Project, Valbonne, France (Sep. 2013).

"3rd Generation Partnership Project;Technical Specification Group Radio Access Network; Evolved Universal Terrestrial Radio Access Network(E-UTRAN);X2 data transport(Release 11)," 3GPP TS 36.424 V11.0.0, total 8 pages, 3rd Generation Partnership Project, Valbonne, France (Sep. 2012).

U.S. Appl. No. 15/148,962, filed May 6, 2016.

Nokia Corporation et al.,"Architectures comparison," 3GPP TSG-RAN WG2 Meeting #68, JeJu, Korea, R2-097020, 7 pages (Nov. 9-13, 2009).

"3rd Generation Partnership Project; Technical Specification Group Services and System Aspects; Telecommunication management; Subscriber and equipment trace; Trace control and configuration management (Release 11)," 3GPP TS 32.422 V11.8.1, 133 pages (Jul. 2013).

"3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11)," 3GPP TS 37.320 V11.3.0, 23 pages (Mar. 2013).

* cited by examiner

METHOD FOR MEASURING SERVICE TRANSMISSION STATUS OF USER EQUIPMENT AND SERVICE STATION

CROSS-REFERENCE TO RELATED APPLICATION

This application is a continuation of U.S. patent application Ser. No. 15/148,962, filed on May 6, 2016, which is a continuation of International Application No. PCT/CN2013/086703, filed on Nov. 7, 2013. All of the aforementioned patent applications are hereby incorporated by reference in their entireties.

TECHNICAL FIELD

Embodiments of the present invention relates to wireless communications technologies, and in particular, to a method for measuring a service transmission status service transmission status and a service station.

BACKGROUND

Minimization of drive tests (MDT) is a technology in which a network and/or a user equipment (UE) automatically collects a measurement result to assist with network problem analysis, to reduce the workload of drive testing.

In a wireless network, network entities involved in the MDT include:

1. an MDT trigger device: a device triggering an MDT process, which is responsible for starting the MDT, and may be a wireless network management device, for example, an operation and maintenance center (OMC), or a core network;

2. an MDT execution device: a device executing MDT measurement, which may be a base station or UE. If it is UE, the UE reports an MDT measurement result to a base station or a base station controller, and then the base station or the base station controller forwards the MDT measurement result to a trace collection entity (TCE); and 3. the trace collection entity TCE: receiving the MDT measurement result.

A general MDT measurement process is shown in FIG. 1. An MDT trigger device sends MDT activation message to a base station or a base station controller. After receiving the MDT activation message, the base station or the base station controller executes MDT measurement; or determines that measurement needs to be executed by UE, and sends a measurement configuration message to the UE. After receiving the measurement configuration message, the UE performs MDT measurement, and reports a measurement result to the base station or the base station controller. The base station or the base station controller reports, to a TCE, an MDT measurement result obtained by the base station or the base station controller through the measurement or the collected MDT measurement result obtained by the UE through the measurement.

In the existing MDT technology, there may be several measurement types as follows:

1. signal level measurement: UE measures a signal level of a wireless signal and reports a measurement result to a base station or a base station controller, and then the base station or the base station controller reports the measurement result to a TCE;

2. QoS measurement: generally a base station executes the QoS measurement (for example, service traffic, a service throughput, or a service delay), where the measurement may be performed at a radio access bearer (RAB) level or a UE level; and 3. accessibility measurement: UE records information about a radio resource control (RRC) establishment failure, and reports the information to a base station or a base station controller, and then the base station or the base station controller reports the information to a TCE.

At present, there is a multi-station transmission technology, that is, multiple service stations are aggregated to transmit data for one UE. The service stations herein may be a base station and a base station controller (for a 2G or 3G mobile communications system), or only base stations (for a 4G communications system). The multi-station transmission technology includes but is not limited to: uplink boosting (UL boosting) in a Universal Mobile Telecommunications System-Long Term Evolution (UMTS-LTE) station aggregation transmission technology (as shown in FIG. 2A), small cell enhancement (SCE) in an evolved NodeB (ENB)-ENB station aggregation transmission technology (as shown in FIG. 2B), a multi-flow transmission technology (as shown in FIG. 2C) in a UMTS NodeB (NodeB)-NodeB aggregation transmission technology, and the like.

In the multi-station transmission technology, generally the multiple service stations are classified into a primary station and one or more secondary stations. A case that may occur includes but is not limited to: all service stations in the multiple service stations simultaneously transmit data packets for UE; some service stations in the multiple service stations transmit data packets for UE; all service stations in the multiple service stations simultaneously transmit data packets of a same service (for example, a same RAB) of UE; and different stations in the multiple service stations respectively transmit data packets of different services (for example, different RABs).

Existing MDT technologies are all technologies applied to transmission between UE and a single service station. In a multi-station transmission scenario in which UE simultaneously transmits data packets for multiple service stations, there is no method for implementing MDT measurement.

SUMMARY

Embodiments of the present invention provide a method for measuring a service transmission status of a user equipment and a service station, which are used to perform service transmission status measurement for a user equipment in a multi-station transmission scenario.

According to a first aspect, a method for measuring a service transmission status of a user equipment is provided, where the method includes:

transmitting, by a first service station, a first data packet for a user equipment;

determining, by the first service station, at least one second service station that transmits a second data packet for the user equipment; and instructing, by the first service station, the at least one second service station to measure a service transmission status of the user equipment, where the first data packet and the second data packet are different data packets of a same service of the user equipment or data packets of different services.

According to the method provided in this solution, a first service station instructs at least one second service station to measure a service transmission status of a user equipment, thereby performing service transmission status measurement for a user equipment in a multi-station transmission scenario.

According to a second aspect, a method for measuring a service transmission status of a user equipment is provided, where the method includes:

transmitting, by a second service station, a second data packet for a user equipment;

receiving, by the second service station, a measurement notification for performing service transmission status measurement for the user equipment, which is sent by a first service station that transmits a first data packet for the user equipment; and performing, by the second service station, the service transmission status measurement for the user equipment according to the measurement notification, where the first data packet and the second data packet are different data packets of a same service of the user equipment or data packets of different services.

According to this solution, a second service station performs service transmission status measurement for a user equipment after receiving a measurement notification of a first service station, thereby performing service transmission status measurement for a user equipment in a multi-station transmission scenario.

According to a third aspect, a method for measuring a service transmission status of a user equipment is provided, where the method includes:

transmitting, by a user equipment, a first data packet for a first service station, and transmitting a second data packet for at least one second service station;

determining, by the user equipment, a final service transmission status measurement result according to a status of data transmission that the user equipment transmits the first data packet on the first service station and a status of data transmission that the user equipment transmits the second data packet on the at least one second service station; and reporting, by the user equipment, the final measurement result to the first service station, where the first data packet and the second data packet are different data packets of a same service of the user equipment or data packets of different services.

According to this solution, a user equipment determines a final service transmission status measurement result according to a status of data transmission that the user equipment transmits a first data packet on a first service station and a status of data transmission that the user equipment transmits a second data packet on at least one second service station, and reports the measurement result to the first service station, thereby implementing that in a multi-station transmission scenario, a user equipment determines a service transmission status measurement result and reports the measurement result to a first service station.

According to a fourth aspect, a method for measuring a service transmission status of a user equipment is provided, where the method includes:

transmitting, by a first service station, a first data packet for a user equipment;

receiving, by the first service station, a service transmission status measurement result reported by the user equipment, where the measurement result is determined by the user equipment according to a status of data transmission that the user equipment transmits the first data packet on the first service station and a status of data transmission that the user equipment transmits a second data packet on at least one second service station; and reporting, by the first service station, the measurement result to a trace collection entity TCE, where the first data packet and the second data packet are different data packets of a same service of the user equipment or data packets of different services.

According to this solution, a first service station receives a service transmission status measurement result reported by a user equipment, and sends the measurement result to a trace collection entity TCE, thereby implementing that in a multi-station transmission scenario, a user equipment reports a service transmission measurement status.

According to a fifth aspect, a method for measuring a service transmission status is provided, where the method includes:

measuring, by a user equipment, a value of a service burst parameter of a service for which data transmission is currently performed; and reporting, by the user equipment, the service burst parameter value obtained through the measurement to a network side device having a wireless connection to the user equipment.

According to this solution, a user equipment measures and reports a service burst parameter value, thereby providing a solution in which a user equipment measures and reports a service burst parameter value.

According to a sixth aspect, a method for measuring a service transmission status is provided, including:

measuring, by a network side device, a value of a service burst parameter of a service for which data transmission is currently performed; and reporting, by the network side device, the service burst parameter value obtained through the measurement to an upper-layer network side device.

According to this solution, a network side device measures a service burst parameter value and reports the service burst parameter value to an upper-layer network side device, thereby providing a solution in which a network side device measures and reports a service burst parameter value.

According to a seventh aspect, a service station is provided, including:

a transceiver unit, configured to transmit a first data packet for a user equipment; and a processing unit, configured to determine at least one second service station that transmits a second data packet for the user equipment, where the transceiver unit is further configured to instruct the at least one second service station to measure a service transmission status of the user equipment, where the first data packet and the second data packet are different data packets of a same service of the user equipment or data packets of different services.

According to the method provided in this solution, a first service station instructs at least one second service station to measure a service transmission status of a user equipment, thereby performing service transmission status measurement for a user equipment in a multi-station transmission scenario.

According to an eighth aspect, a service station is provided, including:

a transceiver unit, configured to transmit a second data packet for a user equipment, and receive a measurement notification for performing service transmission status measurement for the user equipment, which is sent by a first service station that transmits a first data packet for the user equipment; and a processing unit, configured to perform the service transmission status measurement for the user equipment according to the measurement notification received by the transceiver unit, where the first data packet and the second data packet are different data packets of a same service of the user equipment or data packets of different services.

According to this solution, a second service station performs service transmission status measurement for a user equipment after receiving a measurement notification of a first service station, thereby performing service transmission status measurement for a user equipment in a multi-station transmission scenario.

According to a ninth aspect, a user equipment is provided, where the user equipment includes:

a transceiver unit, configured to transmit a first data packet for a first service station, and transmit a second data packet for at least one second service station; and a processing unit, configured to determine a final service transmission status measurement result according to a status of data transmission that the user equipment transmits the first data packet on the first service station and a status of data transmission that the user equipment transmits the second data packet on the at least one second service station, where the transceiver unit is further configured to report the final measurement result to the first service station, where the first data packet and the second data packet are different data packets of a same service of the user equipment or data packets of different services.

According to this solution, a user equipment determines a final service transmission status measurement result according to a status of data transmission that the user equipment transmits a first data packet on a first service station and a status of data transmission that the user equipment transmits a second data packet on at least one second service station, and reports the measurement result to the first service station, thereby implementing that in a multi-station transmission scenario, a user equipment determines a service transmission status measurement result and reports the measurement result to a first service station.

According to a tenth aspect, a service station is provided, including:

a first transceiver unit, configured to transmit a first data packet for a user equipment, and receive a service transmission status measurement result reported by the user equipment, where the measurement result is determined by the user equipment according to a status of data transmission that the user equipment transmits the first data packet on the service station and a status of data transmission that the user equipment transmits a second data packet on at least one second service station; and a second transceiver unit, configured to report the measurement result received by the first transceiver unit to a trace collection entity TCE, where the first data packet and the second data packet are different data packets of a same service of the user equipment or data packets of different services.

According to this solution, a first service station receives a service transmission status measurement result reported by a user equipment, and sends the measurement result to a trace collection entity TCE, thereby implementing that in a multi-station transmission scenario, a user equipment reports a service transmission measurement status.

According to an eleventh aspect, a user equipment is provided, including:

a processing unit, configured to measure a value of a service burst parameter of a service for which data transmission is currently performed; and a transceiver unit, configured to report the service burst parameter value obtained by the processing unit through the measurement to a network side device having a wireless connection to the user equipment.

According to this solution, a user equipment measures and reports a service burst parameter value, thereby providing a solution in which a user equipment measures and reports a service burst parameter value.

According to a twelfth aspect, a network side device is provided, including:

a processing unit, configured to measure a value of a service burst parameter of a service for which data transmission is currently performed; and a transceiver unit, configured to report the service burst parameter value obtained by the processing unit through the measurement to an upper-layer network side device.

According to this solution, a network side device measures a service burst parameter value and reports the service burst parameter value to an upper-layer network side device, thereby providing a solution in which a network side device measures and reports a service burst parameter value.

According to a thirteenth aspect, a service station is provided, including:

an I/O apparatus, configured to transmit a first data packet for a user equipment; and a processor, configured to determine at least one second service station that transmits a second data packet for the user equipment, where the I/O apparatus is further configured to instruct the at least one second service station to measure a service transmission status of the user equipment, where the first data packet and the second data packet are different data packets of a same service of the user equipment or data packets of different services.

According to the method provided in this solution, a first service station instructs at least one second service station to measure a service transmission status of a user equipment, thereby performing service transmission status measurement for a user equipment in a multi-station transmission scenario.

According to a fourteenth aspect, a service station is provided, including:

an I/O apparatus, configured to transmit a second data packet for a user equipment, and receive a measurement notification for performing service transmission status measurement for the user equipment, which is sent by a first service station that transmits a first data packet for the user equipment; and a processor, configured to perform the service transmission status measurement for the user equipment according to the measurement notification received by the I/O apparatus, where the first data packet and the second data packet are different data packets of a same service of the user equipment or data packets of different services.

According to this solution, a second service station performs service transmission status measurement for a user equipment after receiving a measurement notification of a first service station, thereby performing service transmission status measurement for a user equipment in a multi-station transmission scenario.

According to a fifteenth aspect, a user equipment is provided, where the user equipment includes:

an I/O apparatus, configured to transmit a first data packet for a first service station, and transmit a second data packet for at least one second service station; and a processor, configured to determine a final service transmission status measurement result according to a status of data transmission that the user equipment transmits the first data packet on the first service station and a status of data transmission that the user equipment transmits the second data packet on the at least one second service station, where the I/O apparatus is further configured to report the final measurement result to the first service station, where the first data packet and the second data packet are different data packets of a same service of the user equipment or data packets of different services.

According to this solution, a user equipment determines a final service transmission status measurement result according to a status of data transmission that the user equipment transmits a first data packet on a first service station and a status of data transmission that the user equipment transmits a second data packet on at least one second service station, and reports the measurement result to the first service station, thereby implementing that in a multi-station transmission scenario, a user equipment determines a service transmission status measurement result and reports the measurement result to a first service station.

According to a sixteenth aspect, a service station is provided, including:

an I/O apparatus and a processor, where under the control of the processor, the I/O apparatus transmits a first data packet for a user equipment, receives a service transmission status measurement result reported by the user equipment, and reports the measurement result to a trace collection entity TCE, where the measurement result is determined by the user equipment according to a status of data transmission that the user equipment transmits the first data packet on the service station and a status of data transmission that the user equipment transmits a second data packet on at least one second service station; and the first data packet and the second data packet are different data packets of a same service of the user equipment or data packets of different services.

According to this solution, a first service station receives a service transmission status measurement result reported by a user equipment, and sends the measurement result to a trace collection entity TCE, thereby implementing that in a multi-station transmission scenario, a user equipment reports a service transmission measurement status.

According to a seventeenth aspect, a user equipment is provided, including:

a processor, configured to measure a value of a service burst parameter of a service for which data transmission is currently performed; and an I/O apparatus, configured to report the service burst parameter value obtained by the processor through the measurement to a network side device having a wireless connection to the user equipment.

According to this solution, a user equipment measures and reports a service burst parameter value, thereby providing a solution in which a user equipment measures and reports a service burst parameter value.

According to an eighteenth aspect, a network side device is provided, including:

a processor, configured to measure a value of a service burst parameter of a service for which data transmission is currently performed; and an I/O apparatus, configured to report the service burst parameter value obtained by the processor through the measurement to an upper-layer network side device.

According to this solution, a network side device measures a service burst parameter value and reports the service burst parameter value to an upper-layer network side device, thereby providing a solution in which a network side device measures and reports a service burst parameter value.

DETAILED DESCRIPTION

Figure 1:
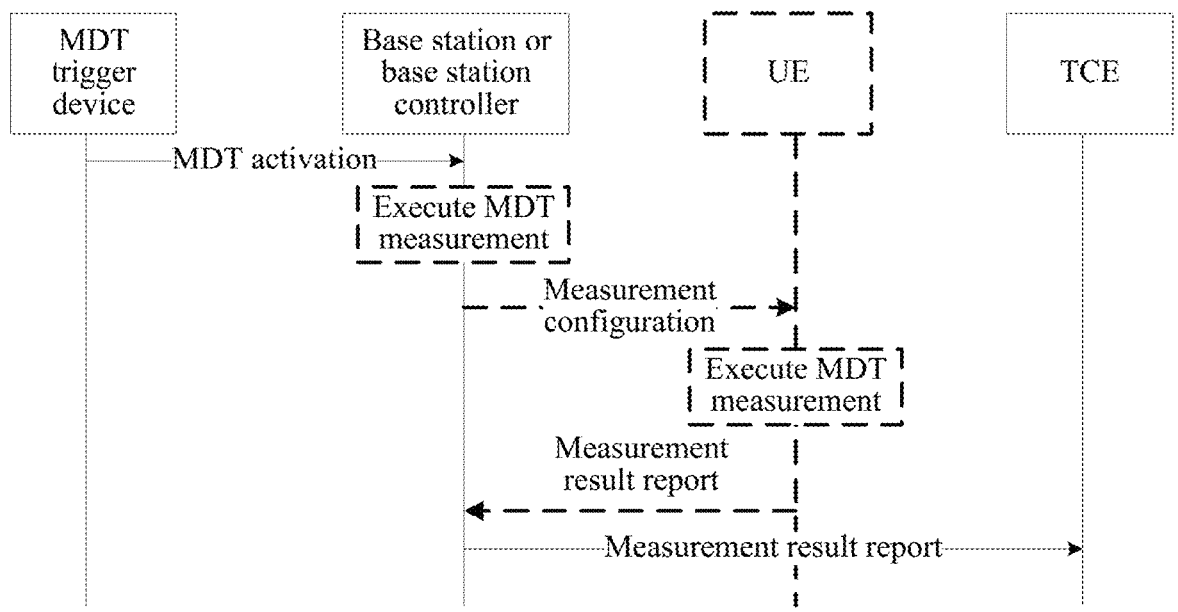
FIG. 1 is a flowchart of a general MDT measurement process.

Embodiments of the present invention provide a method for measuring a service transmission status of a user equipment and a service station.

In the method for measuring a service transmission status of a user equipment provided in the embodiments of the present invention, a first service station (that is, a primary station in a multi-station transmission scenario) transmits a first data packet for a user equipment; and at least one second service station (that is, a secondary station in the multi-station transmission scenario) transmits a second data packet for the user equipment; and the first service station instructs the at least one second service station to measure a service transmission status of the user equipment (optionally, a measurement result is reported), or the first service station instructs the user equipment to perform service transmission status measurement and report a measurement result, where optionally, the first service station reports the received measurement result to a TCE.

In a first method for measuring a service transmission status of a user equipment provided in an embodiment of the present invention, a first service station instructs at least one second service station to measure a service transmission status of a user equipment.

In a second method for measuring a service transmission status of a user equipment provided in an embodiment of the present invention, a second service station performs service transmission status measurement for a user equipment according to a measurement notification of a first service station.

In a third method for measuring a service transmission status of a user equipment provided in an embodiment of the present invention, a user equipment determines a final service transmission status measurement result according to statuses of data transmission of the user equipment on a first service station and a second service station.

In a fourth method for measuring a service transmission status of a user equipment provided in an embodiment of the present invention, a first service station receives a service transmission status measurement result reported by a user equipment and reports the measurement result to a TCE.

The embodiments of the present invention further provide a method for measuring a service transmission status, a user equipment, and a network side device.

In a first method for measuring a service transmission status provided in an embodiment of the present invention, a user equipment measures a value of a service burst parameter of a service for which data transmission is currently performed, and reports the service burst parameter value to a network side device having a wireless connection to the user equipment.

In a second method for measuring a service transmission status provided in an embodiment of the present invention, a network side device measures a value of a service burst parameter of a service for which data transmission is currently performed, and reports the service burst parameter value to an upper-layer network side device.

Figure 2A:
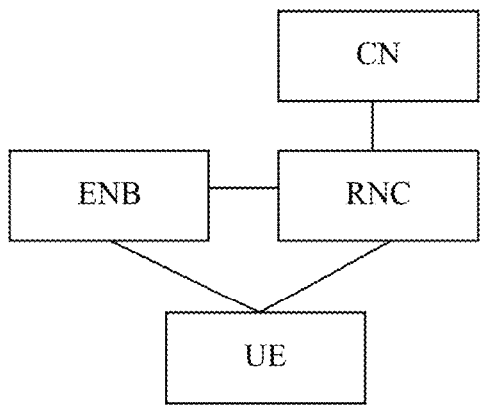
FIG. 2A, FIG. 2B, and FIG. 2C are schematic diagrams of a multi-station transmission technology.
Figure 2B:
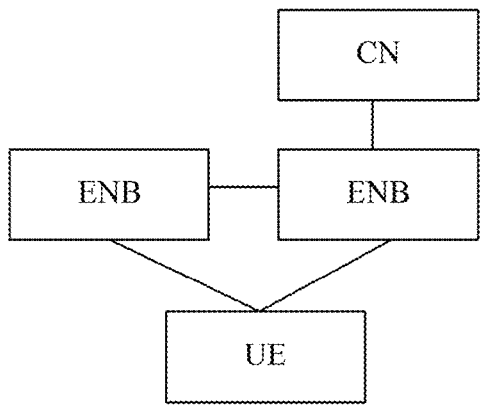
Figure 2C:
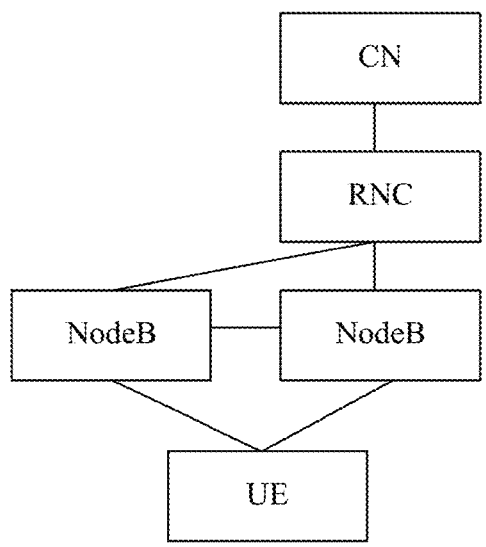

It should be noted that, the method for measuring a service transmission status of a user equipment provided in the embodiments of the present invention may be applied to any multi-station transmission scenario of FIG. 2A, FIG. 2B, and FIG. 2C. The first service station and the second service station may be an RNC and a NodeB that have wireless connections to the user equipment, or only ENBs, or may be a base station controller (BSC) and a base transceiver station (BTS) in a GSM system that are not drawn in FIG. 2A, FIG. 2B, and FIG. 2C.

A possible application scenario of the method for measuring a service transmission status of a user equipment provided in the embodiments of the present invention is: A second service station reports, to a first service station, a measurement result for a user equipment, and the first service station compares the received measurement result with a measurement result, for the user equipment, of the first service station, and determines, according to a comparison result, whether to distribute traffic to the second service station. For example, when the first service station has relatively heavy service load, and the second service station has relatively small traffic of the user equipment, the first service station may consider to distribute traffic to the second service station.

When the method is applied to any multi-station transmission scenario of FIG. 2A, FIG. 2B, and FIG. 2C, a data packet transmission channel between a user equipment and a core network is divided into multiple tributary channels, where one tributary channel is: user equipment-first service station-core network, which is used for transmitting the first data packet in the method, and may be referred to as a "primary tributary channel"; and the other tributary channels respectively correspond to second service stations, which may be referred to as "secondary tributary channels", and are used for transmitting the second data packet in the method. For data transmission on the secondary tributary channels, there may be at least the following two available solutions:

a secondary tributary channel transmission solution 1: the second data packet is forwarded by the first service station, that is, user equipment-second service station-first service station-core network; and a secondary tributary channel transmission solution 2: the second data packet is not forwarded by the first service station, that is, user equipment-second service station-core network.

The two solutions are merely exemplary, and there may be multiple actual transmission manners, which are not limited thereto.

In the first method for measuring a service transmission status provided in the embodiment of the present invention, a user equipment measures a value of a service burst parameter of a service for which data transmission is currently performed, and reports the service burst parameter value to a network side device having a wireless connection to the user equipment. The network side device herein is a network side device having a wireless connection to the user equipment, and the network side device is not required to have a capability of performing measurement for the user equipment, as long as the network side device can receive a measurement result reported by the user equipment. Optionally, the network side device further has a function of instructing the user equipment to perform measurement. The network side device may be: an RNC, a NodeB, an ENB, a BTS, or the like having a wireless connection to the user equipment.

In the second method for measuring a service transmission status provided in the embodiment of the present invention, a network side device measures a value of a service burst parameter of a service for which data transmission is currently performed, and reports the service burst parameter value to an upper-layer network side device. In the method, the network side device may be an RNC, a NodeB, an ENB, a BTS, or the like. When the network side device is a NodeB, the upper-layer network side device is an RNC connected to the NodeB; when the network side device is an ENB, the upper-layer network side device is a core network or an operation and maintenance center (OMC) connected to the ENB; or when the network side device is a BTS, the upper-layer network side device is a BSC connected to the BTS.

In the methods provided in the embodiments of the present invention, the service transmission status measurement may be MDT measurement, or may be other wireless measurement, for example, measurement of a signal to interference ratio (SIR), measurement of a transport channel block error rate (Transport channel BLER), or the like in a UMTS system, as long as the user equipment or the service station can perform the service transmission status measurement.

In the methods provided in the embodiments of the present invention, a measurement trigger device may be a core network or an operation administration and maintenance (OAM) device currently communicating with the user equipment.

In the methods provided in the embodiments of the present invention, the service transmission status measurement includes any one of the following types of measurement:

traffic measurement, throughput measurement, delay measurement, and service burst pattern measurement for acquiring service burst information.

According to a trigger condition, in the methods provided in the embodiments of the present invention, measurement may be classified into event triggered measurement and periodic measurement.

For brevity below, a device instructing to perform measurement is referred to as a measurement control device, and a device receiving a measurement notification and executing measurement is referred to as a measurement execution device.

In the first and second methods for measuring a service transmission status of a user equipment provided in the embodiments of the present invention, the measurement control device includes: the first service station and a measurement trigger device; the measurement execution device includes: the first service station, the second service station, or the user equipment; and when the second service station instructs, according to the measurement notification of the first service station, the user equipment to perform measurement, the second service station is also a measurement control device.

In the third and fourth methods for measuring a service transmission status of a user equipment provided in the embodiments of the present invention, the user equipment is a measurement execution device, and the first service station is a measurement control device.

In the first method for measuring a service transmission status of a user equipment provided in the embodiment of the present invention, the first service station is a measurement control device, and the user equipment is a measurement execution device.

In the first method for measuring a service transmission status provided in the embodiment of the present invention, the network side device is a measurement control device, and the user equipment is a measurement execution device.

In the second method for measuring a service transmission status provided in the embodiment of the present invention, the network side device is a measurement execution device, and the upper-layer network side device is a measurement control device.

For the event triggered measurement, when the measurement control device instructs the measurement execution device to perform the measurement, besides a measurement time, the measurement control device may further notify one or more measurement parameters in a measurement result report time, measurement duration, a measurement type, and a measurement granularity.

For the periodic measurement, when the measurement control device instructs the measurement execution device to perform the measurement, besides a measurement period, the measurement control device may further notify one or more measurement parameters in a measurement start time, a measurement report time, measurement duration, a measurement type, and a measurement granularity.

The measurement execution device determines, according to a received measurement type, whether to determine a measurement result according to traffic, a throughput, delay, or a service burst pattern of the user equipment; and determines, according to a measurement granularity, whether to perform the measurement by using user equipment or service as a granularity.

For the event triggered measurement, the measurement execution device determines, according to a received measurement result report time, a time at which a measurement result is reported; and determines, according to measurement duration, how long the measurement lasts starting from a measurement time.

For the periodic measurement, the measurement execution device determines, according to a measurement start time, when to start the measurement, where optionally, if the measurement control device does not notify the measurement execution device of the measurement start time, after receiving the measurement notification of the first service station, the measurement execution device immediately starts the measurement; the measurement execution device determines, according to a measurement report time, a time at which a measurement result is reported, where optionally, if the measurement control device does not notify the measurement report time, after obtaining a measurement result, the measurement execution device immediately reports the measurement result; and the measurement execution device determines, according to measurement duration, how long the measurement lasts after each measurement period starts, where optionally, if the measurement control device does not notify the measurement duration, the measurement execution device determines the measurement duration as a measurement period.

Optionally, the measurement execution device may report the measurement result, and when reporting the measurement result, may further report a measurement start time or a measurement end time corresponding to the measurement result, so that after receiving the measurement result, the measurement control device performs processing such as statistics collection and merging (for example, obtaining a sum of measurement results for a same user equipment that are reported by different measurement execution devices and that correspond to a same measurement start time).

The measurement granularity is explained below as follows:

If the measurement granularity is user equipment, a measurement result is a result obtained after services of a user equipment are merged. For example, services simultaneously performed by the user equipment include a measurement results for services 1 and a service 2, and if the measurement granularity is user equipment and a measurement type is traffic, the measurement result for the user equipment is a sum of traffic corresponding to the service 1 and traffic corresponding to the service 2.

If the measurement granularity is service, a measurement result is a measurement result corresponding to each service of a user equipment. For example, services simultaneously performed by the user equipment include a service 1 and a service 2, and if the measurement granularity is service and a measurement type is traffic, the measurement result for the user equipment is traffic corresponding to the service 1 and traffic corresponding to the service 2. During specific implementation, for a UMTS system and an LTE system, services may be classified according to RABs, and different RABs correspond to different services.

When the measurement type is service burst pattern measurement for acquiring service burst information, the service burst information includes at least one of the following information:

a start time of a service burst;
an end time of the service burst;
duration of the service burst;
traffic or a throughput of a service during the service burst; and
traffic or a throughput of the service in the last TTI of the service burst.

Figure 21:
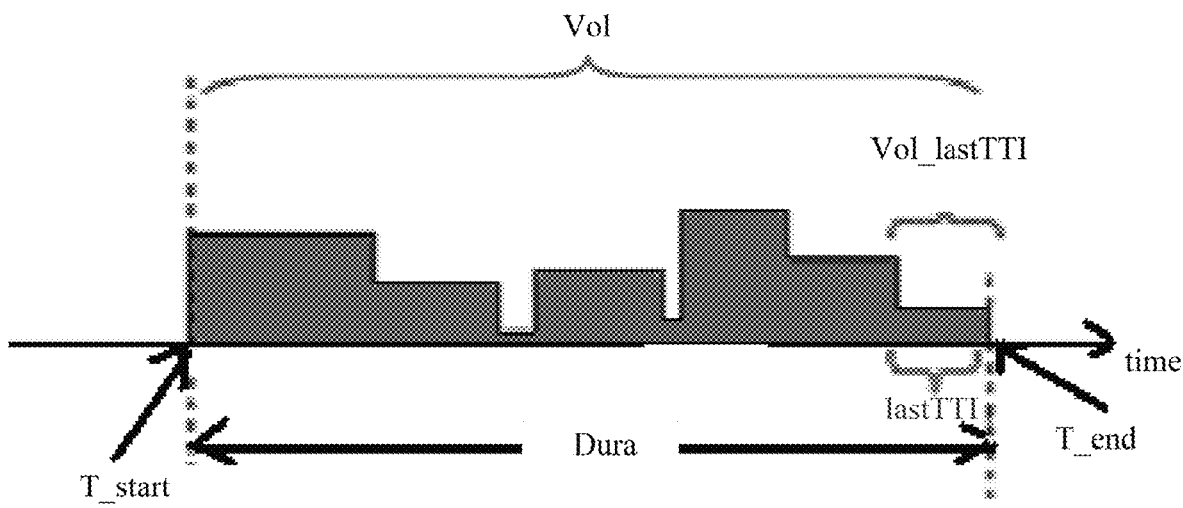
FIG. 21 is a schematic diagram of a service burst according to an embodiment of the present invention.

FIG. 21 is a schematic diagram of a service burst according to an embodiment of the present invention. As shown in FIG. 21, a horizontal axis is a time axis time, T_start is a start time of the service burst, T_end is an end time of the service burst, Dura is duration of the service burst, Vol is traffic or a throughput of a service during the service burst, and Vol_lastTTI is traffic or a throughput of the service in the last TTI of the service burst.

The embodiments of the present invention are further described below in detail with reference to accompanying drawings of the specification.

For brevity, in FIG. 15 to FIG. 18, only one second service station is shown, which, however, should not be understood as that the methods provided in the embodiments of the present invention are only applicable to the case of one second service station, and in the following embodiments, for a case in which a user equipment simultaneously transmits second data packets for two or more second service stations, methods for the second service stations to perform measurement and report measurement reports are the same as a method in the case of one second service station.

Figure 15:
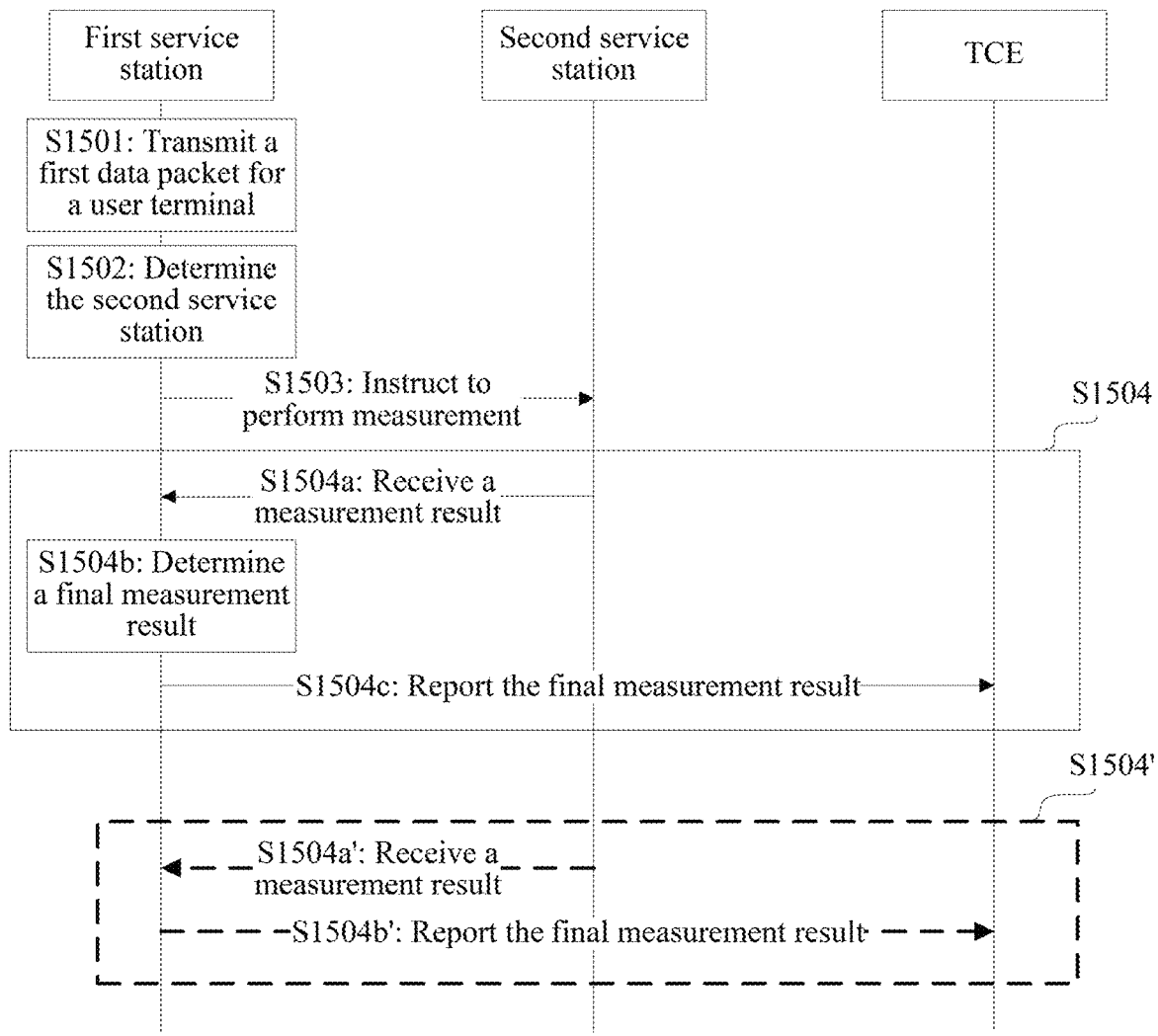
FIG. 15 is a flowchart of a first method for measuring a service transmission status of a user equipment according to an embodiment of the present invention.

FIG. 15 is a flowchart of the first method for measuring a service transmission status of a user equipment according to the embodiment of the present invention. As shown in FIG. 15, the method includes:

S1501: A first service station transmits a first data packet for a user equipment.

S1502: The first service station determines at least one second service station that transmits a second data packet for the user equipment.

S1503: The first service station instructs the at least one second service station to measure a service transmission status of the user equipment.

The first data packet and the second data packet are different data packets of a same service of the user equipment or data packets of different services.

Herein, the first data packet and the second data packet are used for indicating that the first service station and the second service station transmit different data packets. When the user equipment performs service data transmission with the first service station, it may be considered that the first service station transmits the first data packet for the user equipment; and when the user equipment performs service data transmission with the second service station, it may be considered that the second service station transmits the second data packet for the user equipment.

Optionally, before step S1502, the first service station receives a service transmission status measurement activation message of a measurement trigger device, where the measurement activation message may instruct to perform measurement for a user equipment, or instruct to perform measurement for a cell, or perform measurement for a carrier in a cell. If the measurement activation message instructs to perform measurement for a user equipment, after determining that the user equipment transmits the first data packet for the first service station, the first service station uses the user equipment as the user equipment measured in step S1503. If the measurement activation message instructs to perform measurement for a cell or a carrier in a cell, the first service station may select, according to a preset user equipment selection rule (for example, selecting only a user equipment whose average data transmission rate is greater than a preset rate, or selecting only a terminal supporting MDT measurement reporting), a user equipment for which measurement needs to be performed from all user equipments that use the cell or the carrier of the cell and that transmit the first data packet for the first service station, as the user equipment measured in step S1502.

Alternatively, before step S1503, when determining that a related measurement value of a user equipment needs to be acquired for radio resource management (for example, acquiring radio channel quality of the user equipment before larger data transmission bandwidth is allocated to the user equipment), the first service station may determine, according to a radio resource management algorithm set by the first service station, that measurement needs to be performed for the user equipment (for example, measuring an SIR value of the user equipment), and uses the determined user equipment for which measurement needs to be performed as the user equipment in step S1502.

In step S1502, the first service station may determine, in the following manners, at least one second service station that currently transmits the second data packet for the user equipment:

the first service station may send a message to the user equipment, to instruct the user equipment to report information about all second service stations that transmit second data packets for the user equipment (for example, device identifiers), and after receiving the message, the user equipment reports information about all second service stations that currently transmit second data packets for the user equipment;

the first service station may learn, from a wireless measurement report reported by the user equipment before step S1502, information about all second service stations that currently transmit second data packets for the user equipment, where the wireless measurement report reported by the user equipment includes information about a second service station that transmits the second data packet for the user equipment (for example, a device identifier); and if when the user equipment establishes connections to second service stations to transmit second data packets, the first service station sends, to the user equipment, a message used for establishing the connections, the first service station may record information about all second service stations that transmit second data packets for the user equipment, and the first service station uses all second service stations that have established connections to the user equipment to transmit second data packets and that have not released the connections yet as second service stations that currently transmit second data packets for the user equipment.

There are many methods for the first service station to determine the second service station that currently transmits the second data packet for the user equipment, which are not listed one by one due to a space limitation.

Optionally, the method further includes:

sending, by the first service station to a particular core network, the received second data packet that is sent by the user equipment to the particular core network by using the second service station; and sending, by the first service station to the user equipment by using the second service station, the received second data packet that is sent by the particular core network to the user equipment, where the particular core network is a core network that transmits the second data packet for the user equipment.

This solution corresponds to the above-mentioned secondary tributary channel transmission solution 1.

In step S1503, a method for the first service station to instruct the second service station to measure the service transmission status of the user equipment includes but is not limited to the following methods:

instructing, by using a message, the second service station to perform the measurement for the user equipment, where the second service station performs the measurement for the user equipment, and uses a measurement result as a measurement result for the user equipment; and instructing, by using a message, the second service station to acquire a measurement result for the user equipment, where after receiving the message, the second service station instructs the user equipment to perform the measurement and report a measurement result, and the second service station uses the received measurement result reported by the user equipment as the measurement result for the user equipment.

Optionally, the measurement may be classified into periodic measurement and event triggered measurement, and after receiving the measurement notification of the first service station, the second service station may perform the measurement for the user equipment, or may instruct the user equipment to perform the measurement, and report a measurement result to the first service station.

For the event triggered measurement, the instructing, by the first service station, the at least one second service station to measure a service transmission status of the user equipment includes:

sending, by the first service station, a first measurement time to the at least one second service station, so that the at least one second service station performs the service transmission status measurement for the user equipment when the first measurement time arrives, and uses a result obtained through the measurement as a measurement result for the user equipment; or so that the at least one second service station instructs the user equipment to perform the service transmission status measurement when the first measurement time arrives, receives a measurement result that is reported by the user equipment after the measurement, and uses the measurement result as a measurement result for the user equipment.

For the periodic measurement, the instructing, by the first service station, the at least one second service station to measure a service transmission status of the user equipment includes:

sending, by the first service station, a measurement period to the at least one second service station, so that the at least one second service station performs the service transmission status measurement for the user equipment by using the measurement period as a period, and uses a result obtained through the measurement as a measurement result for the user equipment; or so that the at least one second service station instructs the user equipment to perform the measurement by using the measurement period as a period, receives a measurement result that is reported by the user equipment after the measurement, and uses the measurement result as a measurement result for the user equipment.

Optionally, after step S1503, the method further includes:

S1504: The first service station determines a final measurement result for the user equipment. As shown in FIG. 15, the step may include the following two substeps:

S1504*a*: The first service station receives a measurement result returned by the second service station.

S1504*b*: The first service station determines the final measurement result for the user equipment.

Implementation manners of step S1504 include but are not limited to the following three:

Manner 1: The first service station determines the final measurement result for the user equipment according to a received measurement result returned by one second service station.

In Manner 1, the first service station determines only one second service station in step S1502, and the first service station needs only a measurement result returned by the determined one second service station to determine the final measurement result for the user equipment.

For example, if the first service station determines that traffic of the user equipment on each second service station needs to be measured, and the user equipment transmits the second data packet for only one second service station, the first service station determines the final measurement result for the user equipment according to a measurement result returned by the second service station. For example, statistic collection may be performed on multiple measurement results returned by the second service station to obtain an average value or a maximum value, and the value is used as the final measurement result for the user equipment.

Alternatively, if the first service station receives a message of the measurement trigger device, and determines that measurement needs to be performed for a particular cell, and the particular cell is a cell of a second service station, the first service station determines the measurement result for the user equipment according to a measurement result returned by the second service station.

Manner 2: The first service station merges received measurement results returned by at least two second service stations, and then determines the final measurement result for the user equipment according to a merging result.

In Manner 2, the first service station determines multiple second service stations in step S1502, and the first service station needs only measurement results returned by the determined multiple second service stations to determine the final measurement result for the user equipment, without determining the final measurement result for the user equipment according to a measurement result of the first service station.

For example, if the first service station determines that a throughput of the user equipment on each second service station needs to be measured, and determines that the user equipment transmits second data packets for multiple second service stations, the first service station merges measurement results returned by the multiple second service stations, and then determines the final measurement result for the user equipment according to a merging result.

Manner 3: The first service station merges a determined service transmission status measurement result for the user equipment and a received measurement result returned by the at least one second service station, and then determines the final measurement result for the user equipment according to a merging result.

In Manner 3, the first service station determines multiple second service stations in step S1502, and the first service station needs to determine the final measurement result for the user equipment according to a measurement result, for the user equipment, of the first service station and measurement results returned by the determined multiple second service stations.

Optionally, in Manner 2 and Manner 3, the first service station merges measurement results corresponding to a same measurement time in measurement results. There are many methods for the first service station to determine that measurement results correspond to a same measurement time, for example, acquiring, from a message for reporting a measurement result, a sequence number used for identifying a measurement result sequence, and merging measurement results corresponding to a same sequence number; or acquiring timestamp information from a message for reporting a measurement result, and determining, according to the timestamp information, that measurement results correspond to a same measurement time (for example, when a time difference carried in timestamp information corresponding to measurement results is less than a given time difference threshold, determining that the measurement result correspond to a same measurement time); or determining, according to a message sequence number of an underlying protocol message used for carrying a measurement result, that measurement results correspond to a same measurement time; or that when measurement results are reported, the measurement results are sequenced according to time and then filled in a message used for reporting the measurement results, and the first service station determines, according to a sequence of the measurement results in the received message, a time corresponding to each measurement result.

Optionally, the present invention may also be not limited to the manner in which measurement results, corresponding to a same measurement time, of service stations are merged. For example, for the event measurement, the first service station collects and merges measurement results of service stations. For the periodic measurement, measurement results of service stations received within a same measurement period are merged.

A merging method for the first service station to merge measurement results corresponding to a same measurement time in measurement results is described by using subsequent Example 1.

Optionally, after step S1504b, step S1504 further includes step S1504c.

S1504c: The first service station reports the determined final measurement result to a TCE.

Optionally, in step S1504c, the reporting, by the first service station, the determined final measurement result to a TCE includes:

reporting, by the first service station, information about a particular cell together with the determined final measurement result to the TCE, where the particular cell is a serving cell managed by a particular service station and used by the user equipment, where the particular service station includes one or more service stations in the at least one second service station corresponding to the measurement result, or one or more service stations in the first service station and the at least one second service station that correspond to the measurement result.

The information about the serving cell may include one or more of the following information: an identifier of the serving cell, a frequency used by the serving cell, a scrambling code used by the serving cell, and the like. The first service station sends the information about the serving cell to the TCE. Optionally, the TCE may perform, according to the information about the serving cell, statistics collection processing and the like on measurement results corresponding to the same serving cell, for example, perform statistics collection to obtain a cell throughput of the serving cell or average traffic of user equipments in the cell.

Optionally, step S1504c includes:

reporting, by the first service station, particular indication information together with the final measurement result to the TCE, where the particular indication information is used for indicating whether the final measurement result is related to a status of service data transmission that the user equipment transmits the first data packet on the first service station.

Alternatively, after step S1503, the method further includes:

S1504': The first service station receives a measurement result returned by the second service station, and reports the measurement result to a TCE.

Step S1504' may include the following two substeps:

S1504a': The first service station receives the measurement result returned by the second service station.

S1504b': The first service station reports the received measurement result to the TCE.

A difference between the method in step S1504' and Manner 1 in step S1504 is that, the first service station does not process the received measurement result returned by the second service station, and directly reports the measurement result to the TCE.

Optionally, step S1503 includes:

sending, by the first service station to the at least one second service station, device identification information used for identifying a TCE and measurement identification information used for identifying the service transmission status measurement performed for the user equipment, so that after determining a measurement result for the user equipment, the at least one second service station reports the determined measurement result together with the measurement identification information to the TCE identified by the device identification information.

In this optional solution, after performing the service transmission status measurement for the user equipment, the second service station directly reports the measurement result obtained through the measurement together with the measurement identification information to the TCE.

The device identification information may include: a device number, a device name, a device address, and the like.

Optionally, in the optional solution, after receiving a notification message, for instructing to activate the measurement, of the measurement trigger device, the first service station determines the user equipment measured in step S1502, and performs step S1503, to instruct the second service station perform the measurement. Then, after the notification message for instructing to activate the measurement is received, before step S1503, the method further includes:

acquiring, by the first service station, the device identification information and the measurement identification information from the received notification message for instructing to activate the measurement.

Figure 16:
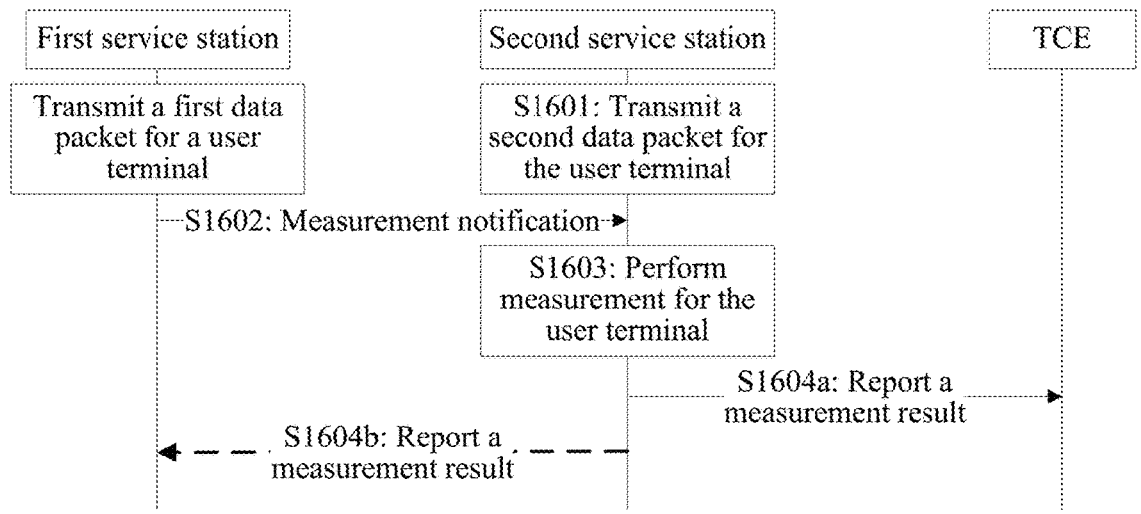
FIG. 16 is a flowchart of a second method for measuring a service transmission status of a user equipment according to an embodiment of the present invention.

FIG. 16 is a flowchart of the second method for measuring a service transmission status of a user equipment according to the embodiment of the present invention. As shown in FIG. 16, the method includes:

S1601: A second service station transmits a second data packet for a user equipment.

S1602: The second service station receives a measurement notification for performing service transmission status measurement for the user equipment, which is sent by a first service station that transmits a first data packet for the user equipment.

S1603: The second service station performs the service transmission status measurement for the user equipment according to the measurement notification.

The first data packet and the second data packet are different data packets of a same service of the user equipment or data packets of different services.

Optionally, the method further includes:

sending, by the second service station to a particular core network by using the first service station, the received second data packet that is sent by the user equipment to the particular core network; and sending, by the second service station to the user equipment, the received second data packet that is sent by the particular core network to the user equipment and that is forwarded by the first service station, where the particular core network is a core network that transmits the second data packet for the user equipment.

This preferred solution corresponds to the foregoing secondary tributary channel transmission solution 1.

Step S1603 includes:

performing, by the second service station, the measurement for the user equipment according to the measurement notification, and determining a measurement result for the user equipment according to a measurement result, where the second service station may use a result obtained by performing the measurement for the user equipment as the measurement result for the user equipment, or the second service station may perform processing such as statistics collection on a result obtained by performing the measurement for the user equipment (for example, obtaining a maximum value or an average value in multiple measurement results), and use a result after the processing as the measurement result for the user equipment; or instructing, by the second service station according to the measurement notification, the user equipment to perform the measurement, and determining a measurement result for the user equipment according to a measurement result reported by the user equipment, where the second service station may use the measurement result reported by the user equipment as the measurement result for the user equipment, or the second service station may perform processing such as statistics collection on the measurement result reported by the user equipment (for example, obtaining a maximum value or average value in multiple measurement results), and use a result after the processing as the measurement result for the user equipment.

Optionally, after step S1603, the method further includes:

S1604a: reporting, by the second service station, an obtained measurement result to a TCE; or S1604b: reporting, by the second service station, an obtained measurement result to the first service station.

Optionally, if the second service station reports the measurement result to the TCE, after step S1602, before step S1603, the method further includes: acquiring, by the second service station from the measurement notification, device identification information used for identifying the TCE and measurement identification information used for identifying the measurement performed for the user equipment; and step S1604a includes: determining, by the second service station, the TCE according to the device identification information; and reporting, by the second service station, the measurement result together with the measurement identification information to the TCE, where the device identification information may include: a device number, a device name, a device address, and the like.

Optionally, step S1604a includes: reporting, by the second service station, information about a particular cell together with the measurement result to the TCE; and optionally, step S1604b includes: reporting, by the second service station, information about a particular cell together with the measurement result to the first service station, where the particular cell is a serving cell managed by the second service station and used by the user equipment, and the information about the serving cell may include one or more of the following information: an identifier of the serving cell, a frequency used by the serving cell, a scrambling code used by the serving cell, and the like. The second service station sends the information about the serving cell to the TCE. Optionally, the TCE may perform, according to the information about the serving cell, statistics collection processing and the like on measurement results corresponding to the same serving cell, for example, perform statistics collection to obtain a cell throughput of the serving cell or average traffic of user equipments in the cell.

Figure 17:
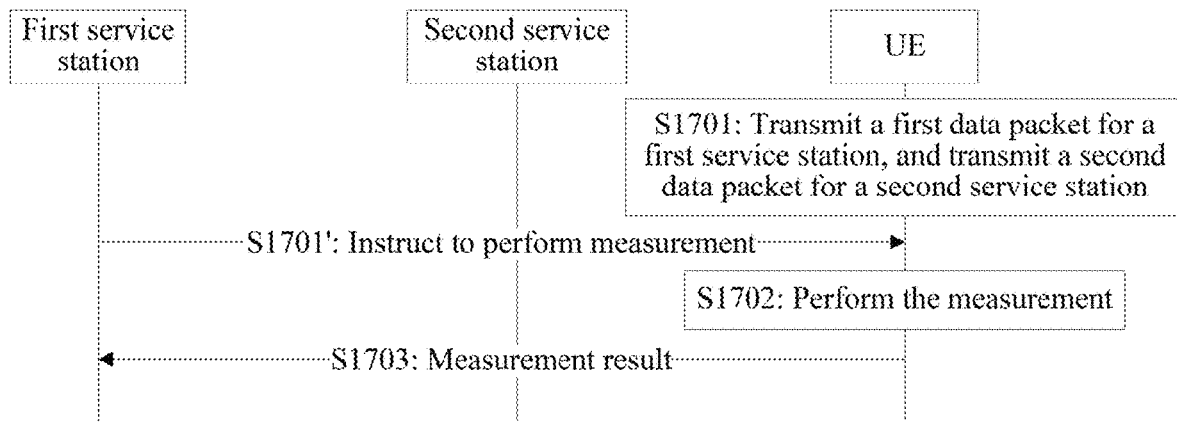
FIG. 17 is a flowchart of a third method for measuring a service transmission status of a user equipment according to an embodiment of the present invention.

FIG. 17 is a flowchart of the third measurement method for measuring a service transmission status of a user equipment according to the embodiment of the present invention. As shown in FIG. 17, the method includes:

S1701: A user equipment transmits a first data packet for a first service station, and transmits a second data packet for at least one second service station.

S1702: The user equipment determines a final service transmission status measurement result according to a status of data transmission that the user equipment transmits the first data packet on the first service station and a status of data transmission that the user equipment transmits the second data packet on the at least one second service station.

S1703: The user equipment reports the final measurement result to the first service station.

The first data packet and the second data packet are different data packets of a same service of the user equipment or data packets of different services.

Optionally, the method further includes:

transmitting, by the user equipment, data with a particular core network, where the particular core network is a core network currently communicating with the user equipment, where the second data packet sent by the user equipment to the particular core network by using the at least one second service station is forwarded by the first service station to the particular core network; and the second data packet that is sent by the particular core network to the user equipment and that is received by the user equipment by using the at least one second service station is forwarded by the first service station to the second service station.

This preferred solution corresponds to the foregoing secondary tributary channel transmission solution 1.

A method for the user equipment to determine the final measurement result according to data transmission statuses in the third method for measuring a service transmission status of a user equipment is described below by using examples:

when measurement is throughput measurement, the user equipment determines, according to a throughput of the user equipment on each service station, a throughput, corresponding to the service station, of the user equipment, and then optionally obtains a sum of throughput measurement results corresponding to all the service stations as the final measurement result;

when measurement is traffic measurement, the user equipment determines, according to traffic of the user equipment on each service station, traffic, corresponding to the service station, of the user equipment, and then optionally obtains a sum of traffic measurement results corresponding to all the service stations as the final measurement result; or when measurement is delay measurement, the user equipment determines, according to a delay of the user equipment on each service station, a delay, corresponding to the service station, of the user equipment, and then optionally obtains an average value of delay measurement results corresponding to all the service stations as the final measurement result.

Optionally, after step S1701, before step S1702, the method further includes:

S1701': The user equipment receives a notification message, for performing service transmission status measurement, of the first service station.

Optionally, a measurement granularity in the method may be: UE or service.

If the measurement granularity is UE, step S1702 includes:

determining, by the user equipment according to the status of data transmission that the user equipment transmits the first data packet on the first service station, a service transmission status measurement result corresponding to the first service station;

determining, by the user equipment according to a status of data transmission that the user equipment transmits the second data packet on each service station in the at least one second service station, a service transmission status measurement result corresponding to the second service station; and merging, by the user equipment, the determined service transmission status measurement result corresponding to the first service station and service transmission status measurement result corresponding to each service station in the at least one second service station, to obtain the final measurement result.

If the measurement granularity is service, step S1702 includes: determining, by the user equipment for each service in services on which the service transmission status measurement needs to be performed, a final measurement result corresponding to the service.

The determining, by the user equipment for each service in services on which the service transmission status measurement needs to be performed, a final measurement result corresponding to the service includes:

for each service in the services on which the service transmission status measurement needs to be performed, determining, by the user equipment according to a data transmission status of the service when the user equipment transmits the first data packet on the first service station, a service transmission status measurement result, corresponding to the first service station, for the service;

for each service in the services on which the service transmission status measurement needs to be performed, determining, by the user equipment according to a data transmission status of the service when the user equipment transmits the second data packet on each service station in the at least one second service station, a service transmission status measurement result, corresponding to the service station, for the service; and merging, by the user equipment, the determined service transmission status measurement result, corresponding to the first service station, for the service and service transmission status measurement result, corresponding to each service station in the at least one second service station, for the service, to obtain the final measurement result corresponding to the service.

For a specific method for the user equipment to merge measurement results in step S1702, reference may also be made to Example 1. The only difference is that, in step S1702, the user equipment instead of a service station merges measurement results.

A method in which the user equipment determines a measurement result for each service station in service stations, and merges the determined measurement results is described above. The following describes a method in which the user equipment selects, from the first service station and service stations in second service stations, service stations that need to perform the measurement, and determines a final measurement result according to data transmission statuses on the service stations that need to perform the measurement, and herein, the user equipment does not need to merge measurement results.

Optionally, step S1702 includes: determining, by the user equipment according to a data transmission status on each service station that needs to perform the service transmission status measurement, a final measurement result corresponding to the service station, where the service station that needs to perform the measurement is some or all service stations in the first service station and the at least one second service station.

Optionally, the reporting, by the user equipment, the final measurement result in step S1703 includes:

reporting, by the user equipment for each service station that needs to perform the service transmission status measurement, information about a particular cell together with the determined final measurement result corresponding to the service station, where the particular cell is a serving cell used by the user equipment and managed by the service station that needs to perform the measurement, and the information about the serving cell may include one or more of the following information: an identifier of the serving cell, a frequency used by the serving cell, a scrambling code used by the serving cell, and the like. The first service station sends the information about the serving cell to the TCE. Optionally, the TCE may perform, according to the information about the serving cell, statistics collection processing and the like on measurement results corresponding to the same serving cell, for example, perform statistics collection to obtain a cell throughput of the serving cell or average traffic of user equipments in the cell.

Figure 18:
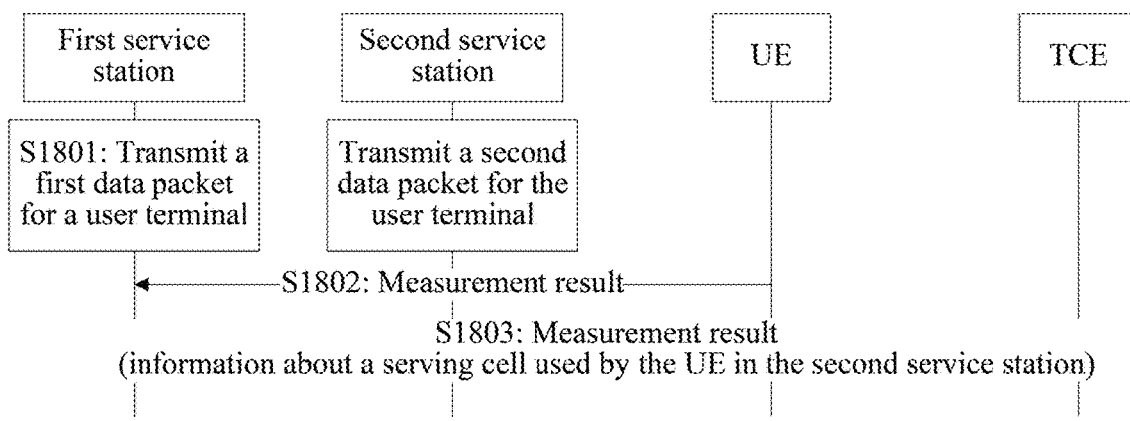
FIG. 18 is a flowchart of a fourth method for measuring a service transmission status of a user equipment according to an embodiment of the present invention.

FIG. 18 is a flowchart of the fourth method for measuring a service transmission status of a user equipment according to the embodiment of the present invention. As shown in FIG. 18, the method includes:

S1801: A first service station transmits a first data packet for a user equipment.

S1802: The first service station receives a service transmission status measurement result reported by the user equipment, where the measurement result is determined by the user equipment according to a status of data transmission that the user equipment transmits the first data packet on the first service station and a status of data transmission that the user equipment transmits a second data packet on at least one second service station.

S1803: The first service station sends the measurement result to a TCE.

The first data packet and the second data packet are different data packets of a same service of the user equipment or data packets of different services.

A method for the user equipment to determine a final measurement result according to data transmission statuses in the fourth method for measuring a service transmission status of a user equipment is described below by using examples:

when measurement is throughput measurement, the user equipment determines, according to a throughput of the user equipment on each service station, a throughput, corresponding to the service station, of the user equipment, and then optionally obtains a sum of throughput measurement results corresponding to all the service stations as the final measurement result;

when measurement is traffic measurement, the user equipment determines, according to traffic of the user equipment on each service station, traffic, corresponding to the service station, of the user equipment, and then optionally obtains a sum of traffic measurement results corresponding to all the service stations as the final measurement result; or when measurement is delay measurement, the user equipment determines, according to a delay of the user equipment on each service station, a delay, corresponding to the service station, of the user equipment, and then optionally obtains an average value of delay measurement results corresponding to all the service stations as the final measurement result.

In the method, the measurement result may be a measurement result obtained by the user equipment by performing the measurement, or may be a final measurement result obtained by the user equipment by performing processing such as merging on measurement results obtained through the measurement.

Optionally, the method further includes:

sending, by the first service station to a particular core network, the received second data packet that is sent by the user equipment to the particular core network and that is forwarded by the at least one second service station; and sending, by the first service station to the user equipment by using the at least one second service station, the received second data packet that is sent by the particular core network to the user equipment, where the particular core network is a core network currently communicating with the user equipment.

This preferred solution corresponds to the foregoing secondary tributary channel transmission solution 1.

Optionally, for different measurement granularities, the first service station executes different methods.

When a measurement granularity is service, after the first service station receives the measurement result, before the first service station sends the measurement result to the TCE, the method further includes: determining, by the first service station, that the measurement result is a measurement result for a service currently performed by the user equipment; and determining, by the first service station, whether the user equipment uses the first service station to transmit the service; and step S1803 includes: sending, by the first service station to the TCE, the measurement result together with information used for indicating whether the user equipment uses the first service station to transmit the service.

Optionally, the first service station may further send information about a particular cell together with the measurement result to the TCE. A specific method is: after step S1802, before step S1803, determining, by the first service station, that the measurement result is determined by the user equipment according to a data transmission status of the user equipment on one second service station; and determining, by the first service station, information about a particular cell in the second service station; and the reporting, by the first service station, the measurement result to a TCE includes: sending, by the first service station, the measurement result together with the information about the particular cell to the TCE, where the particular cell is a serving cell managed by the second service station and used by the user equipment, and the information about the serving cell may include one or more of the following information: an identifier of the serving cell, a frequency used by the serving cell, a scrambling code used by the serving cell, and the like. The first service station sends the information about the serving cell to the TCE. Optionally, the TCE may perform, according to the information about the serving cell, statistics collection processing and the like on measurement results corresponding to the same serving cell, for example, perform statistics collection to obtain a cell throughput of the serving cell or average traffic of user equipments in the cell.

In the four methods for measuring a service transmission status of a user equipment, although the step that the user equipment transmits the first data packet for the first service station or the user equipment transmits the second data packet for the second service station is written before the step that the first service station instructs to perform the measurement, it does not indicate that after the step of instructing to perform the measurement, the data packet transmission process between the user equipment and the service station ends, and actually, the data packet transmission process may be continued even after a measurement result is obtained; and at least when the first service station instructs to perform the measurement, the data packet transmission process is performed.

Figure 19:
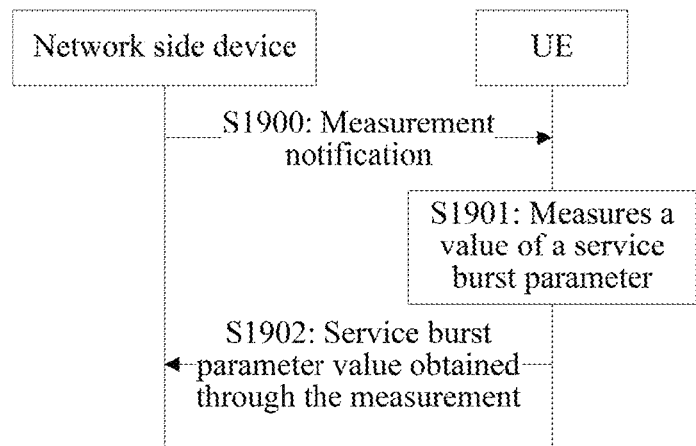
FIG. 19 is a flowchart of a first method for measuring a service transmission status according to an embodiment of the present invention.

FIG. 19 is a flowchart of the first method for measuring a service transmission status according to the embodiment of the present invention. As shown in the FIG. 19, the method includes the following steps:

S1901: A user equipment measures a value of a service burst parameter of a service for which data transmission is currently performed.

S1902: The user equipment reports the service burst parameter value obtained through the measurement to a network side device having a wireless connection to the user equipment.

Optionally, before step S1901, the method further includes:

S1900: The user equipment receives a notification message, for instructing to report the service burst parameter of the service, of the network side device.

Figure 20:
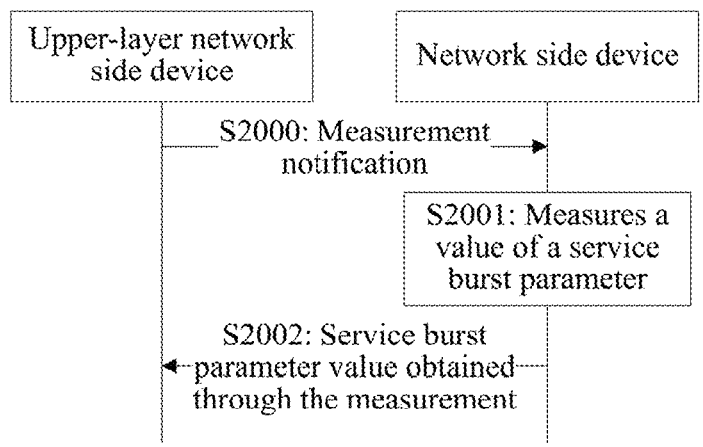
FIG. 20 is a flowchart of a second method for measuring a service transmission status according to an embodiment of the present invention.

FIG. 20 is a flowchart of the second method for measuring a service transmission status according to the embodiment of the present invention. As shown in the FIG. 20, the method includes the following steps:

S2001: A network side device measures a value of a service burst parameter of a service for which data transmission is currently performed.

S2002: The network side device reports the service burst parameter value obtained through the measurement to an upper-layer network side device.

Optionally, before step S2001, the method further includes:

S2000: The network side device receives a notification message, for instructing to report the service burst parameter of the service, of the upper-layer network side device.

A method for a first service station to merge measurement results is described below by using Example 1.

Example 1: Method for a First Service Station to Merge Measurement Results

The following describes, by using specific measurement types as examples, a method in which a first service station merges multiple measurement results, and determines a final measurement result for a user equipment according to a merging result in the first method for measuring a service transmission status of a user equipment provided in the embodiment of the present invention.

A measurement type is traffic, and UE simultaneously transmits a first data packet for a station 1, and transmits second data packets for a station 2 and a station 3, where the station 1 is a primary station, and merges measurement results. Corresponding to a same measurement time T1, traffic of the UE determined by the station 1 is F1, traffic of the UE reported by the station 2 is F2, and traffic of the UE reported by the station 3 is F3; and then the station 1 determines that a final measurement result of measurement performed for the UE at the T1 moment is F_T1=F1+F2+F3.

A measurement type is throughput, and UE simultaneously transmits a first data packet for a station 3, and transmits a second data packet for a station 1, where the station 3 is a primary station, and merges measurement results. Corresponding to a same measurement time T2, a throughput of the UE determined by the station 3 is Tp1, and a throughput of the UE reported by the station 1 is Tp2; and then the station 3 determines that a final measurement result of measurement performed for the UE at the T2 moment is that Tp_T2=Tp1+Tp2.

A measurement type is delay, and UE simultaneously transmits a first data packet for a station 2, and transmits second data packets for a station 3 and a station 4, where the station 2 merges measurement results. Corresponding to a same measurement time T3, a delay of the UE determined by the station 2 is D1, a delay of the UE reported by the station 3 is D2, and a delay of the UE reported by an RNC4 is D3; and then the station 2 may determine a final delay according to preset multiple policies. For example, the station 2 determines that a final measurement result for the UE at the T3 moment is that D_T3=MAX{D1, D2, D3} (where MAX{ } indicates that a maximum value is obtained); in this case, optionally, the station 2 may further determine a service station corresponding to the maximum value, and if the station 2 needs to report the final measurement result to a TCE, the station 2 may report device information of the service station corresponding to the maximum value together with the final measurement result. Alternatively, the station 2 determines that a final measurement result for the UE at the T3 moment is that D_T3=AVE{D1, D2, D3} (where AVE{ } indicates that an average value is obtained).

A measurement type is service burst pattern, and UE simultaneously transmits a second data packet for a station 4, and transmits a first data packet for a station 5, where the station 5 is a primary station, and merges measurement results. A measurement granularity is a UE level. The UE has only RAB1 on the station 4, and therefore, determining, by the station 4, a measurement result for the UE is determining a measurement result for RAB1 of the UE on the station 4; and the UE has only RAB2 on the station 5, and therefore, determining, by the station, a measurement result for the UE is determining a measurement result for RAB2 of the UE on the station 5.

Figure 22:
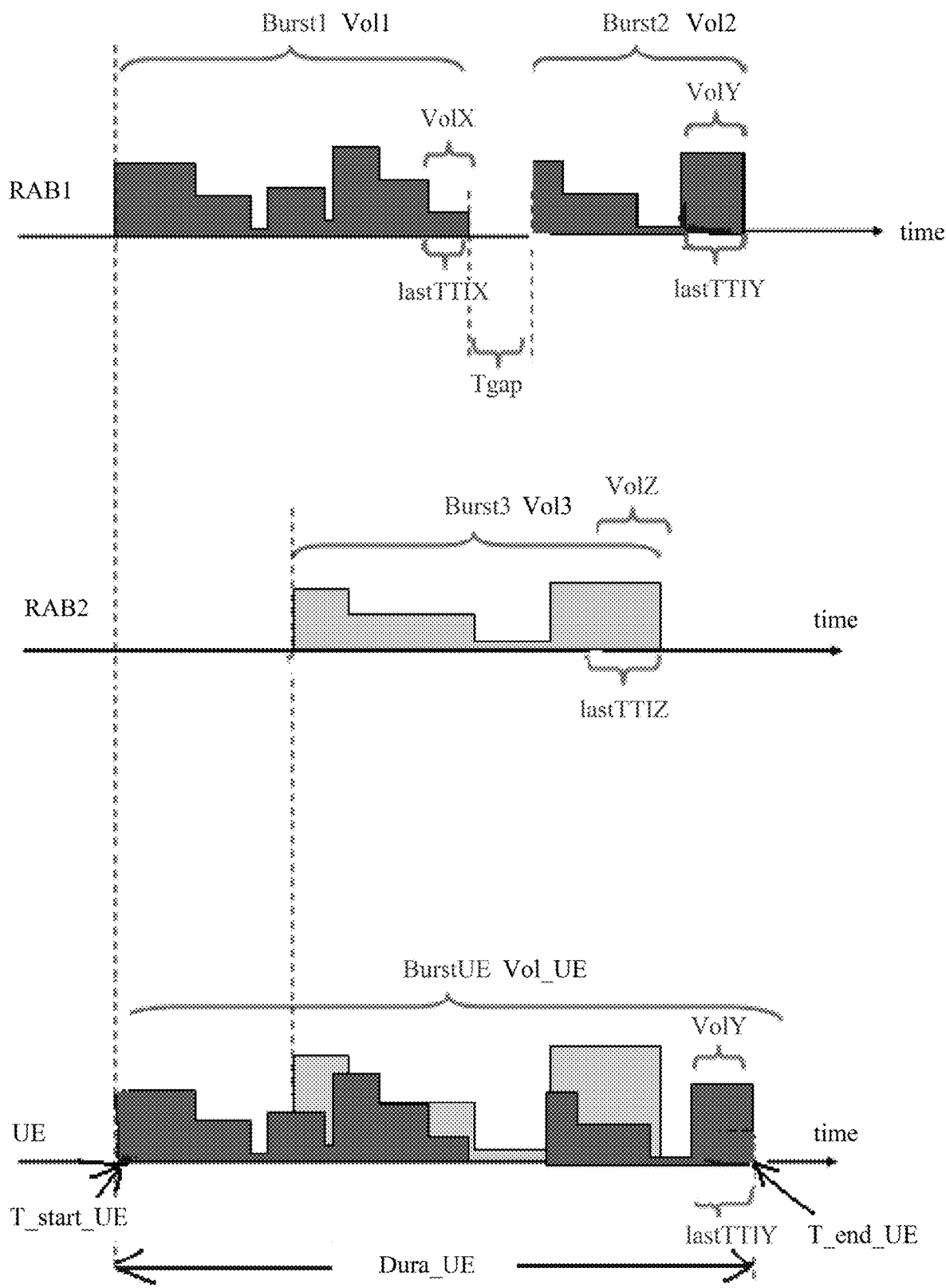
FIG. 22 is a schematic diagram of a method for merging service burst related measurement results according to an embodiment of the present invention.

FIG. 22 is a schematic diagram of a method for merging service burst related measurement according to an embodiment of the present invention. As shown in FIG. 22, a horizontal axis is a time axis time. Corresponding to a same measurement time, two service bursts: Burst1 and Burst2 occur on RAB1 within measurement duration, corresponding throughputs (herein, throughputs are used as an example, and during actual measurement, traffic may also be measured) are respectively Vol1 and Vol2, in the last TTI of Burst 1, that is, lastTTIX, a throughput is VolX, and in the last TTI of Burst 2, that is, lastTTIY, a throughput is VolY. There is a gap Tgap between Burst1 and Burst2. A service burst: Burst3 occurs on RAB2 within the measurement duration, a throughput corresponding to the service burst is Vol3, and in the last TTI of Burst3, that is, lastTTIZ, a throughput is VolZ.

As shown in FIG. 22, a service burst of UE after merging is BurstUE, and because in T_gap between Burst1 and Burst2, data is transmitted during Burst3, the service bursts become one service burst after merged. A start time of the service burst T_start_UE is a start time of an earliest service burst in Burst1, Burst2, and Burst3, and herein is a service burst start time of Burst1. An end time of the service burst T_end_UE is an end time of the latest service burst in Burst1, Burst2, and Burst3, and herein is a service burst end time of Burst2. A throughput corresponding to BurstUE is a sum of throughputs respectively corresponding to Burst1, Burst2, and Burst3, that is, Vol_UE=Vol1+Vol2+Vol3. Because time of the last TTI of Burst1, that is, lastTTIY, is the latest, the last TTI of BurstUE is lastTTIY, and a throughput corresponding to the last TTI of BurstUE is VolY. Duration of BurstUE Dura_UE is the end time minus the start time of the entire service burst BurstUE, that is, Dura_UE=T_end_UE−T_start_UE.

Optionally, a first service station may determine, according to a pattern of the service burst after merging, that is, BurstUE, throughput, traffic, or delay information or the like corresponding to the service burst. For example, the throughput of the service burst is Vol_UE=Vol1+Vol2+Vol3; if Vol represents traffic, traffic of the service burst is Vol_UE=Vol1+Vol2+Vol3; and for a delay, an average value of latencies of service bursts may be obtained, where a latency of each service burst may be a time length from a moment at which the first service station receives the service burst to a start time of the service burst.

For ease of understanding of methods provided in the embodiments of the present invention, three specific embodiments are described below with reference to accompanying drawings by using MDT measurement as an example.

In the following three embodiments, a first service station is referred to as a "station 1", a second service station is referred to as a "station 2", a measurement trigger device is referred to as an "MDT trigger device", and a trace collection entity is referred to as a "TCE".

Embodiment 1

In Embodiment 1, UE simultaneously performs data transmission by using a station 1 and a station 2, where the station 1 is a primary station, and stores a connection between the UE and a core network; and the station 2 is a secondary station, and connects the UE to the core network by using the station 1. A primary serving cell of the UE is a serving cell of the UE in the primary station (that is, the station 1), and a secondary serving cell of the UE is a serving cell of the UE in the secondary station (that is, the station 2).

Figure 23:
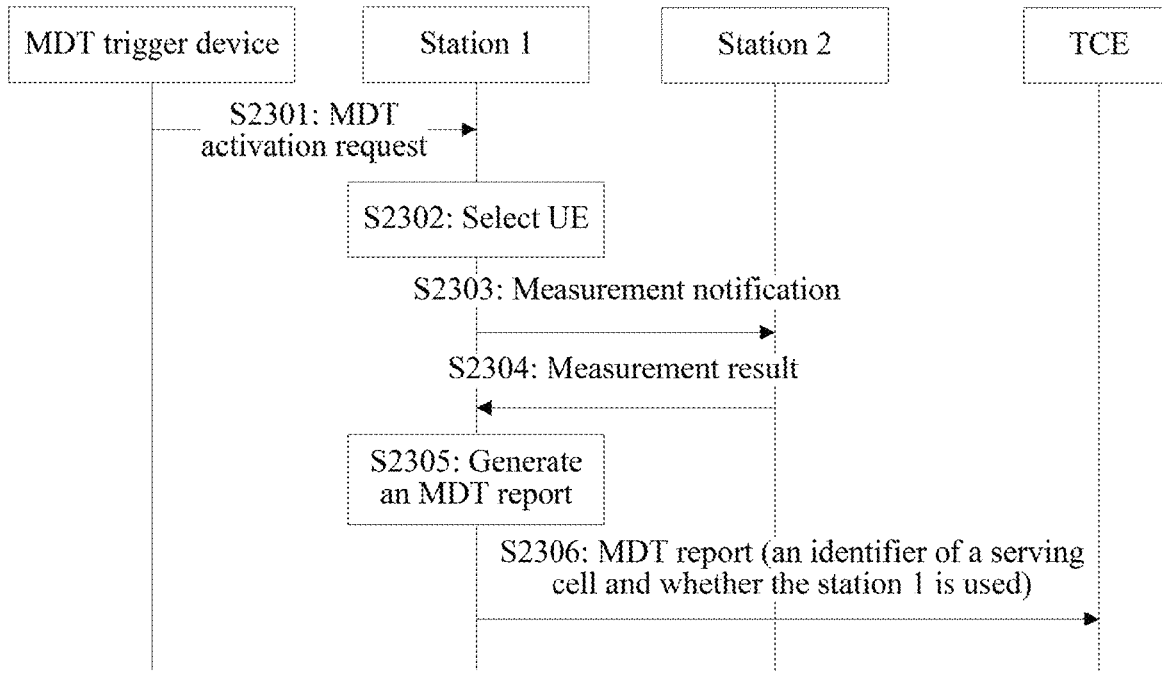
FIG. 23 is a flowchart of a measurement method according to Embodiment 1 of the present invention.

As shown in FIG. 23, a method provided in Embodiment 1 includes the following steps:

S2301: An MDT trigger device sends an MDT activation request to a station 1, where the request may be used for performing MDT activation for UE, or performing MDT activation for a cell.

S2302: The station 1 selects UE to perform measurement, where the station 1 may autonomously select the UE, or may select the UE according to information indicated in the MDT activation request (for example, select the UE according to a UE identifier in the MDT activation request, or select the UE according to a selection condition that is set in the MDT activation request (for example, UE currently performing data service transmission)).

S2303: The station 1 instructs a station 2 to report a measurement result for the selected UE.

The station 1 may add the following control information to a notification message:

1) a measurement period: specifying how often the station 2 performs the measurement;

2) a report period: specifying how often the station 2 performs measurement report; and 3) a measurement type: traffic, throughput, delay, or service burst pattern measurement.

S2304: The station 2 reports a measurement result to the station 1.

S2305: The station 1 generates an MDT report according to the measurement result reported by the station 2 (optionally, a measurement result, for the UE, of the station 1 may be used as well).

Specifically, the MDT report generated by the station 1 includes at least one of the following information:

1) a measurement result, in which UE is used as a granularity, of multiple stations that is obtained by merging, for example, various service burst information such as a throughput, traffic, a delay, and a service burst pattern of the UE;

2) a measurement result, in which UE is used as a granularity, of a single station, for example, a throughput, traffic, a delay, or a service burst pattern of the UE on the station 1 or the station 2;

3) a measurement result in which service is used as a granularity, for example, services simultaneously performed by the UE include a service 1 and a service 2, and then a throughput, traffic, a delay, or a service burst pattern of the service 1 or the service 2 may be reported, where when a service is simultaneously carried on the station 1 and the station 2 for transmission, a throughput of the service is a measurement result obtained after a measurement result, for the service, of the station 1 and a measurement result for the service reported by the station 2 are merged; or if a service is transmitted on only one station at a same moment, a measurement result for the service is a measurement result determined by the station transmitting the service;

4) information indicating whether the station 1 is used for transmission, where specifically, the information may be indication information, used for indicating which service (RABID) is not transmitted by using the station 1, or may be specifically an identifier of a serving cell used by each service, so as to notify a TCE of the serving cell used by the service; and 5) an identifier of a serving cell used by the UE in the station 2.

S2306: The station 1 sends the generated MDT report to a TCE.

Embodiment 2

In Embodiment 2, UE simultaneously performs data transmission by using a station 1 and a station 2, where the station 1 is a primary station, and stores a connection between the UE and a core network; and the station 2 is a secondary station, and connects the UE to the core network by using the station 1. A primary serving cell of the UE is a serving cell of the UE in the primary station (that is, the station 1), and a secondary serving cell of the UE is a serving cell of the UE in the secondary station (that is, the station 2). A main difference from Embodiment 1 is that, the station 2 does not report an MDT report to the station 1, but directly reports the MDT report to a TCE device.

Figure 24:
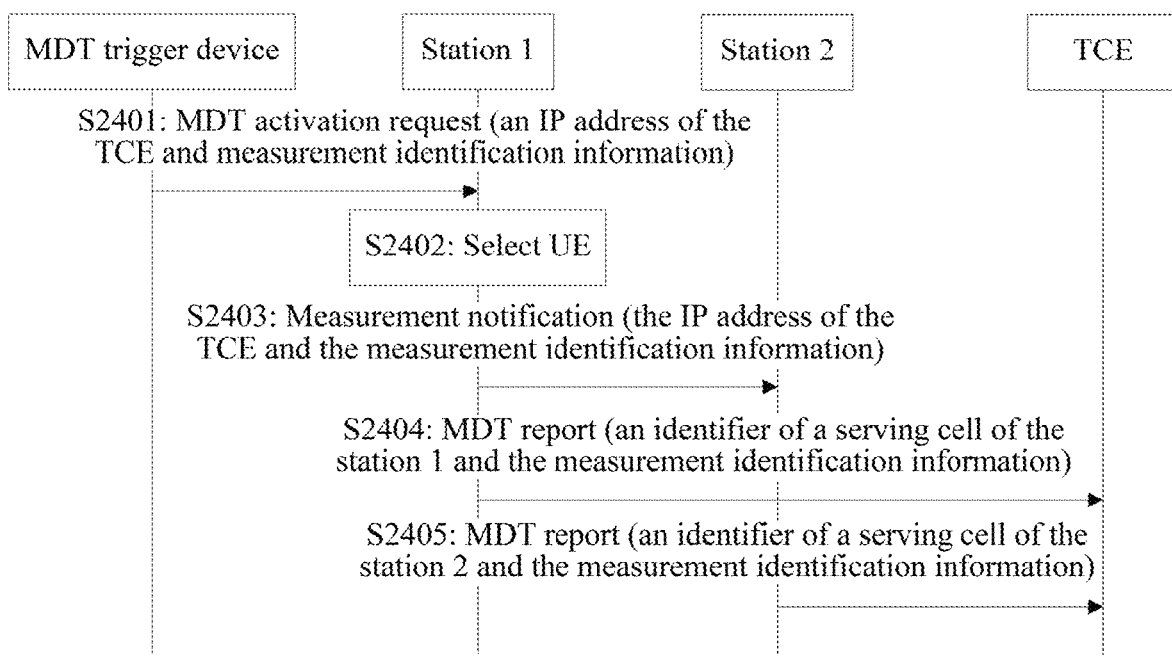
FIG. 24 is a flowchart of a measurement method according to Embodiment 2 of the present invention.

As shown in FIG. 24, a method provided in Embodiment 2 includes the following steps:

S2401: An MDT trigger device sends an MDT activation request to a station 1, where the request carries an IP address of a TCE and measurement identification information.

S2402: The station 1 selects UE to perform measurement.

S2403: The station 1 instructs a station 2 to determine a measurement result for the selected UE.

After selecting the UE, if determining that the UE is connected to the station 2, the station 1 instructs the station 2 to determine a measurement result for the selected UE, and notifies the station 2 of the measurement identification information and the IP address of the TCE.

S2404: The station 1 performs the measurement for the UE, and reports an MDT report obtained through the measurement to the TCE, and reports an identifier of a serving cell, used by the UE, of the station 1 and the measurement identification information as well.

S2405: The station 2 performs the measurement for the UE, and reports an MDT report obtained through the measurement to the TCE, and reports an identifier of a serving cell, used by the UE, of the station 2 and the measurement identification information as well.

Embodiment 3

In Embodiment 3, UE simultaneously performs data transmission by using a station 1 and a station 2, where the station 1 is a primary station, and stores a connection between the UE and a core network; and the station 2 is a secondary station, and connects the UE to the core network by using the station 1. A primary serving cell of the UE is a serving cell of the UE in the primary station (that is, the station 1), and a secondary serving cell of the UE is a serving cell of the UE in the secondary station (that is, the station 2). A main difference from Embodiment 1 and Embodiment 2 is that, the UE generates an MDT report, and sends the MDT report to a TCE by using the station 1.

Figure 25:
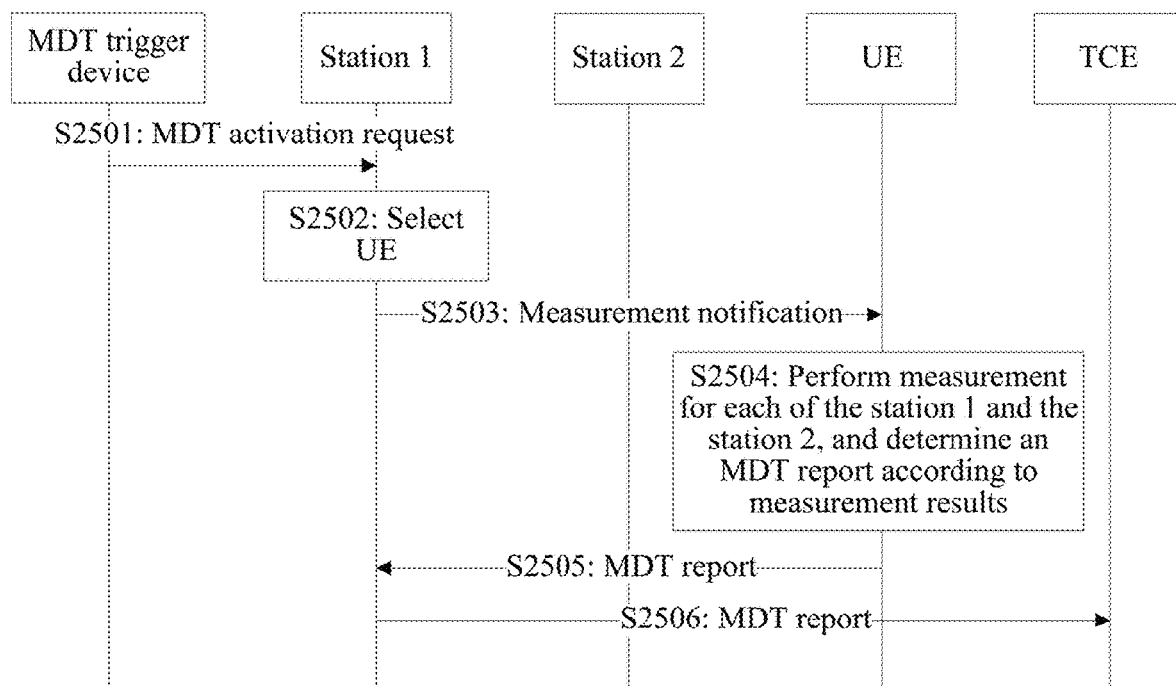
FIG. 25 is a flowchart of a measurement method according to Embodiment 3 of the present invention.

As shown in FIG. 25, a method provided in Embodiment 3 includes the following steps:

S2501: An MDT trigger device sends an MDT activation request to a station 1.

S2502: The station 1 selects UE.

S2503: The station 1 instructs the selected UE to perform measurement.

S2504: The UE performs the measurement for each of the station 1 and a station 2, and determines an MDT report according to measurement results.

S2505: The UE reports the MDT report to the station 1.

S2506: The station 1 reports the MDT report to a TCE, where the report may include information used for indicating whether the UE uses the station 1 to perform data transmission, and an identifier of a serving cell used by the UE in station 2.

Figure 3:
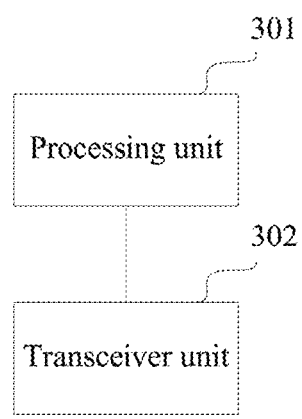
FIG. 3 is a schematic structural diagram of a first service station according to an embodiment of the present invention.

FIG. 3 is a schematic structural diagram of a first service station according to an embodiment of the present invention. As shown in FIG. 3, the service station includes:

a transceiver unit 302, configured to transmit a first data packet for a user equipment; and a processing unit 301, configured to determine at least one second service station that transmits a second data packet for the user equipment, where the transceiver unit 302 is further configured to instruct the at least one second service station to measure a service transmission status of the user equipment, where the first data packet and the second data packet are different data packets of a same service of the user equipment or data packets of different services.

Optionally, the transceiver unit 302 is specifically configured to:

send a first measurement time to the at least one second service station, so that the at least one second service station performs the service transmission status measurement for the user equipment when the first measurement time arrives, and uses a result obtained through the measurement as a measurement result for the user equipment; or so that the at least one second service station instructs the user equipment to perform the service transmission status measurement when the first measurement time arrives, receives a measurement result that is reported by the user equipment after the measurement, and uses the measurement result as a measurement result for the user equipment.

Optionally, the transceiver unit 302 is specifically configured to:

send a measurement period to the at least one second service station, so that the at least one second service station performs the service transmission status measurement for the user equipment by using the measurement period as a period, and uses a result obtained through the measurement as a measurement result for the user equipment; or so that the at least one second service station instructs the user equipment to perform the service transmission status measurement by using the measurement period as a period, receives a measurement result that is reported by the user equipment after the measurement, and uses the measurement result as a measurement result for the user equipment.

Optionally, the transceiver unit 302 is further configured to: after instructing the at least one second service station to perform the service transmission status measurement for the user equipment, receive a measurement result returned by one second service station; and the processing unit 301 is further configured to determine a final measurement result for the user equipment according to the measurement result received by the transceiver unit 302; or the transceiver unit 302 is further configured to: after instructing the at least one second service station to perform the service transmission status measurement for the user equipment, receive measurement results returned by at least two second service stations; and the processing unit 301 is further configured to: merge the measurement results received by the transceiver unit 302, and then determine a final measurement result for the user equipment according to a merging result; or the transceiver unit 302 is further configured to: after instructing the at least one second service station to perform the service transmission status measurement for the user equipment, receive a measurement result returned by the at least one second service station; and the processing unit 301 is further configured to: merge a service transmission status measurement result, determined by the processing unit, for the user equipment and the measurement result received by the transceiver unit, and then determine a final measurement result for the user equipment according to a merging result.

Optionally, the transceiver unit 302 is further configured to: after instructing the at least one second service station to perform the service transmission status measurement for the user equipment, receive a measurement result returned by one second service station; and the processing unit 301 is further configured to determine a final measurement result for the user equipment according to the measurement result received by the transceiver unit 302; or the transceiver unit 302 is further configured to: after instructing the at least one second service station to perform the service transmission status measurement for the user equipment, receive measurement results returned by at least two second service stations; and the processing unit 301 is further configured to: merge measurement results corresponding to a same measurement time in the measurement results received by the transceiver unit 302, and then determine a final measurement result for the user equipment according to a merging result; or the transceiver unit 302 is further configured to: after instructing the at least one second service station to perform the service transmission status measurement for the user equipment, receive a measurement result returned by the at least one second service station; and the processing unit 301 is further configured to: merge measurement results corresponding to a same measurement time in the measurement result received by the transceiver unit 302, and then determine a final measurement result for the user equipment according to a merging result.

Optionally, the transceiver unit 302 is further configured to: after the processing unit 301 determines the final measurement result for the user equipment, report the final measurement result to a trace collection entity TCE.

Optionally, the transceiver unit 302 is specifically configured to:

report information about a particular cell together with the final measurement result to the TCE, where the particular cell is a serving cell managed by a particular service station and used by the user equipment, where the particular service station includes one or more service stations in the at least one second service station corresponding to the measurement result, or one or more service stations in the service station and the at least one second service station that correspond to the measurement result.

Optionally, the transceiver unit 302 is specifically configured to:

report particular indication information together with the final measurement result to the TCE, where the particular indication information is used for indicating whether the final measurement result is related to a status of service data transmission that the user equipment transmits the first data packet on the service station.

Optionally, the transceiver unit 302 is further configured to:

receive a measurement result returned by the second service station, and report the measurement result to a TCE.

Optionally, the transceiver unit 302 is further configured to:

send, to the at least one second service station, device identification information used for identifying a TCE and measurement identification information used for identifying the service transmission status measurement performed for the user equipment, so that after determining a measurement result for the user equipment, the at least one second service station reports the determined measurement result together with the measurement identification information to the TCE identified by the device identification information.

Optionally, the processing unit 301 is further configured to:

after the transceiver unit 302 receives a notification message, for instructing to activate the measurement, of a measurement trigger device, acquire the device identification information and the measurement identification information from the notification message received by the transceiver unit 302.

Optionally, the transceiver unit 302 is further configured to:

send, to a particular core network, the received second data packet that is sent by the user equipment to the particular core network by using the second service station; and send, to the user equipment by using the second service station, the received second data packet that is sent by the particular core network to the user equipment, where the particular core network is a core network that transmits the second data packet for the user equipment.

Optionally, the service transmission status measurement includes any one of the following types of measurement:

traffic measurement, throughput measurement, delay measurement, and service burst pattern measurement for acquiring service burst information.

Optionally, the service burst information includes at least one of the following information:

a start time of a service burst;
an end time of the service burst;
duration of the service burst;
traffic or a throughput of a service during the service burst; and
traffic or a throughput of the service in the last TTI of the service burst.

Figure 4:
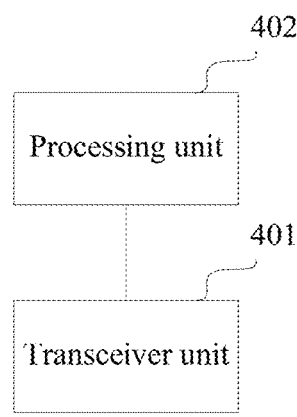
FIG. 4 is a schematic structural diagram of a second service station according to an embodiment of the present invention.

FIG. 4 is a schematic structural diagram of a second service station according to an embodiment of the present invention. As shown in FIG. 4, the service station includes:

a transceiver unit 401, configured to transmit a second data packet for a user equipment, and receive a measurement notification for performing service transmission status measurement for the user equipment, which is sent by a first service station that transmits a first data packet for the user equipment; and a processing unit 402, configured to perform the service transmission status measurement for the user equipment according to the measurement notification received by the transceiver unit, where the first data packet and the second data packet are different data packets of a same service of the user equipment or data packets of different services.

Optionally, the transceiver unit 401 is further configured to:

report, to a trace collection entity TCE or the first service station, a measurement result that is obtained by the processing unit 402 by performing the transmission status measurement.

Optionally, the transceiver unit 401 reports the measurement result to the TCE, and the processing unit 402 is further configured to:

acquire, from the measurement notification, device identification information used for identifying the TCE and measurement identification information used for identifying the service transmission status measurement performed for the user equipment, and determine the TCE according to the device identification information; and the transceiver unit 401 is specifically configured to report the measurement result together with the measurement identification information to the TCE.

Optionally, the transceiver unit 401 reports the measurement result to the TCE, and the transceiver unit 401 is specifically configured to report information about a particular cell together with the measurement result to the TCE; and the transceiver unit 401 reports the measurement result to the first service station, and the transceiver unit 401 is specifically configured to report information about a particular cell together with the measurement result to the first service station, where the particular cell is a serving cell managed by the service station and used by the user equipment.

Optionally, the transceiver unit 401 is further configured to:

send, to a particular core network by using the first service station, the received second data packet that is sent by the user equipment to the particular core network; and send, to the user equipment, the received second data packet that is sent by the particular core network to the user equipment and that is forwarded by the first service station, where the particular core network is a core network that transmits the second data packet for the user equipment.

Optionally, the service transmission status measurement includes any one of the following types of measurement:

traffic measurement, throughput measurement, delay measurement, and service burst pattern measurement for acquiring service burst information.

Optionally, the service burst information includes at least one of the following information:

a start time of a service burst;
an end time of the service burst;
duration of the service burst;
traffic or a throughput of a service during the service burst; and
traffic or a throughput of the service in the last TTI of the service burst.

Figure 5:
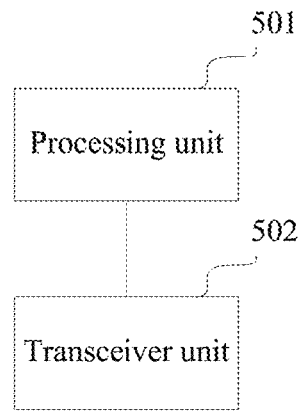
FIG. 5 is a schematic structural diagram of a first user equipment according to an embodiment of the present invention.

FIG. 5 is a schematic structural diagram of a first user equipment according to an embodiment of the present invention. As shown in the FIG. 5, the user equipment includes:

a transceiver unit 502, configured to transmit a first data packet for a first service station, and transmit a second data packet for at least one second service station; and a processing unit 501, configured to determine a final service transmission status measurement result according to a status of data transmission that the user equipment transmits the first data packet on the first service station and a status of data transmission that the user equipment transmits the second data packet on the at least one second service station, where the transceiver unit 502 is further configured to report the final measurement result to the first service station, where the first data packet and the second data packet are different data packets of a same service of the user equipment or data packets of different services.

Optionally, the transceiver unit 502 is further configured to: before the processing unit 501 determines the final measurement result, receive a notification message, for performing service transmission status measurement, of the first service station.

Optionally, the processing unit 501 is specifically configured to:

determine, according to the status of data transmission that the user equipment transmits the first data packet on the first service station, a service transmission status measurement result corresponding to the first service station; and determine, according to a status of data transmission that the user equipment transmits the second data packet on each service station in the at least one second service station, a service transmission status measurement result corresponding to the second service station; and merge the determined service transmission status measurement result corresponding to the first service station and service transmission status measurement result corresponding to each service station in the at least one second service station, to obtain the final measurement result.

Alternatively, the processing unit 501 is specifically configured to:

determine, for each service in services on which the service transmission status measurement needs to be performed, a final measurement result corresponding to the service.

Optionally, the processing unit 501 is specifically configured to:

for each service in the services on which the service transmission status measurement needs to be performed, determine, according to a data transmission status of the service when the user equipment transmits the first data packet on the first service station, a service transmission status measurement result, corresponding to the first service station, for the service;

for each service in the services on which the service transmission status measurement needs to be performed, determine, by the user equipment according to a data transmission status of the service when the user equipment transmits the second data packet on each service station in the at least one second service station, a service transmission status measurement result, corresponding to the service station, for the service; and merge the determined service transmission status measurement result, corresponding to the first service station, for the service and service transmission status measurement result, corresponding to each service station in the at least one second service station, for the service, to obtain the final measurement result corresponding to the service.

Alternatively, the processing unit 501 is specifically configured to:

when determining the final measurement result, determine, according to a data transmission status on each third service station that needs to perform the service transmission status measurement, a final measurement result corresponding to the service station, where the third service station is some or all service stations in the first service station and the at least one second service station.

Optionally, the transceiver unit 502 is specifically configured to:

when reporting the final measurement result, report, for each third service station that needs to perform the service transmission status measurement, information about a particular cell together with the determined final measurement result corresponding to the service station, where the particular cell is a serving cell used by the user equipment and managed by the service station that needs to perform the measurement.

Optionally, the transceiver unit 502 is further configured to:

transmit data with a particular core network, where the particular core network is a core network currently communicating with the user equipment, where the second data packet sent by the transceiver unit 502 to the particular core network by using the at least one second service station is forwarded by the first service station to the particular core network; and the second data packet that is sent by the particular core network to the user equipment and that is received by the transceiver unit 502 by using the at least one second service station is forwarded by the first service station to the second service station.

Optionally, the service transmission status measurement includes any one of the following types of measurement:

traffic measurement, throughput measurement, delay measurement, and service burst pattern measurement for acquiring service burst information.

Optionally, the service burst information includes at least one of the following information:

a start time of a service burst;

an end time of the service burst;

duration of the service burst;

traffic or a throughput of a service during the service burst; and traffic or a throughput of the service in the last TTI of the service burst.

Figure 6:
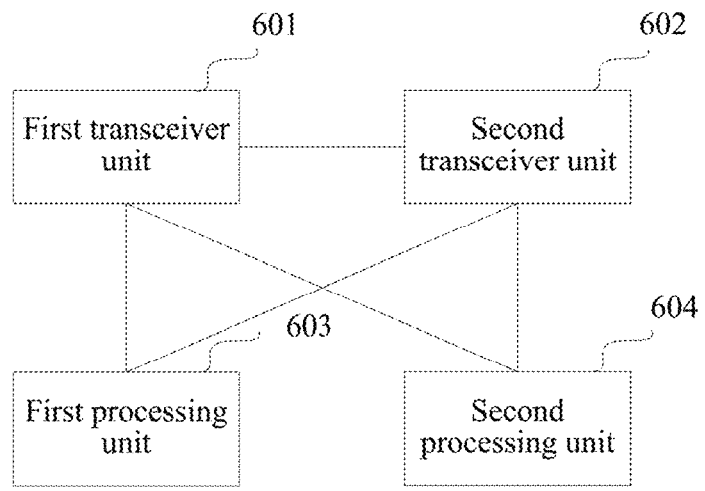
FIG. 6 is a schematic structural diagram of a third service station according to an embodiment of the present invention.

FIG. 6 shows a third service station according to an embodiment of the present invention. As shown in FIG. 6, the service station includes:

a first transceiver unit 601, configured to transmit a first data packet for a user equipment, and receive a service transmission status measurement result reported by the user equipment, where the measurement result is determined by the user equipment according to a status of data transmission that the user equipment transmits the first data packet on the service station and a status of data transmission that the user equipment transmits a second data packet on at least one second service station; and a second transceiver unit 602, configured to report the measurement result received by the first transceiver unit 601 to a trace collection entity TCE, where the first data packet and the second data packet are different data packets of a same service of the user equipment or data packets of different services.

Optionally, the service station further includes:

a first processing unit 603, where the first processing unit 603 is configured to: after the first transceiver unit 601 receives the measurement result, before the second transceiver unit 602 sends the measurement result to the TCE, determine that the measurement result is a measurement result for a service currently performed by the user equipment, and determine whether the user equipment uses the service station to transmit the service; and the second transceiver unit 602 is specifically configured to send, to the TCE, the measurement result together with information used for indicating whether the user equipment uses the service station to transmit the service.

Optionally, the service station further includes:

a second processing unit 604, where the second processing unit 604 is configured to: after the first transceiver unit 601 receives the measurement result, before the second transceiver unit 602 sends the measurement result to the TCE, determine that the measurement result is determined by the user equipment according to a status of data transmission that the user equipment transmits the second data packet on one second service station, and determine information about a particular cell; and the second transceiver unit 602 is specifically configured to send the measurement result together with the information about the particular cell to the TCE, where the particular cell is a serving cell managed by the second service station and used by the user equipment.

Optionally, the first transceiver unit 601 is further configured to send, to a particular core network, the received second data packet that is sent by the user equipment to the particular core network and that is forwarded by the at least one second service station; and send, to the user equipment by using the at least one second service station, the received second data packet that is sent by the particular core network to the user equipment, where the particular core network is a core network currently communicating with the user equipment.

Optionally, the service transmission status measurement includes any one of the following types of measurement:

traffic measurement, throughput measurement, delay measurement, and service burst pattern measurement for acquiring service burst information.

Optionally, the service burst information includes at least one of the following information:

a start time of a service burst;
an end time of the service burst;
duration of the service burst;
traffic or a throughput of a service during the service burst; and
traffic or a throughput of the service in the last TTI of the service burst.

In the third service station provided in this embodiment of the present invention, the first processing unit 603 and the second processing unit 604 may both exist, or only one of them exists, or neither exists, and a specific structure is determined according to a requirement for a function of the service station.

Figure 7:
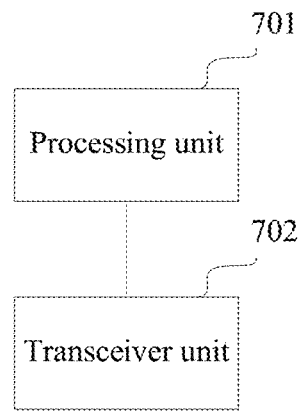
FIG. 7 is a schematic structural diagram of a second user equipment according to an embodiment of the present invention.

FIG. 7 is a schematic structural diagram of a second user equipment according to an embodiment of the present invention. As shown in the FIG. 7, the user equipment includes:

a processing unit 701, configured to measure a value of a service burst parameter of a service for which data transmission is currently performed; and a transceiver unit 702, configured to report the service burst parameter value obtained by the processing unit 701 through the measurement to a network side device having a wireless connection to the user equipment.

Optionally, the transceiver unit 701 is further configured to:

before the processing unit 702 measures the service burst parameter of the service, receive a notification message, for instructing to report the service burst parameter of the service, of the network side device.

Optionally, the service burst parameter includes one or more of the following parameters:

a start time of a service burst;
an end time of the service burst;
duration of the service burst;
traffic or a throughput of a service during the service burst; and
traffic or a throughput of the service in the last TTI of the service burst.

Figure 8:
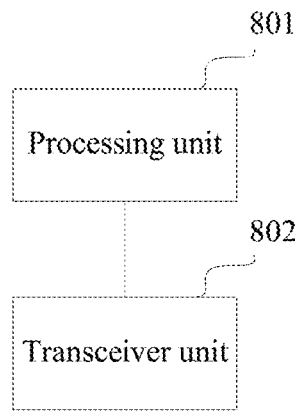
FIG. 8 is a schematic structural diagram of a first network side device according to an embodiment of the present invention.

FIG. 8 shows a first network side device according to an embodiment of the present invention. As shown in FIG. 8, the network side device includes:

a processing unit 801, configured to measure a value of a service burst parameter of a service for which data transmission is currently performed; and a transceiver unit 802, configured to report the service burst parameter value obtained by the processing unit 801 through the measurement to an upper-layer network side device.

Optionally, the transceiver unit 802 is further configured to: before the processing unit 801 measures the service burst parameter of the service, receive a notification message, for instructing to report the service burst parameter of the service, of the upper-layer network side device.

Optionally, the service burst parameter includes one or more of the following parameters:

a start time of a service burst;
an end time of the service burst;
duration of the service burst;
traffic or a throughput of a service during the service burst; and
traffic or a throughput of the service in the last TTI of the service burst.

Figure 9:
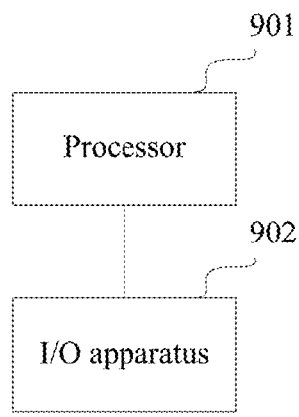
FIG. 9 is a schematic structural diagram of a fourth service station according to an embodiment of the present invention.

FIG. 9 is a schematic structural diagram of a fourth service station according to an embodiment of the present invention. As shown in FIG. 9, the service station includes:

an I/O apparatus 902, configured to transmit a first data packet for a user equipment; and a processor 901, configured to determine at least one second service station that transmits a second data packet for the user equipment, where the I/O apparatus 902 is further configured to instruct the at least one second service station to measure a service transmission status of the user equipment, where the first data packet and the second data packet are different data packets of a same service of the user equipment or data packets of different services.

Optionally, the I/O apparatus 902 is specifically configured to:

send a first measurement time to the at least one second service station, so that the at least one second service station performs the service transmission status measurement for the user equipment when the first measurement time arrives, and uses a result obtained through the measurement as a measurement result for the user equipment; or so that the at least one second service station instructs the user equipment to perform the service transmission status measurement when the first measurement time arrives, receives a measurement result that is reported by the user equipment after the measurement, and uses the measurement result as a measurement result for the user equipment.

Optionally, the I/O apparatus 902 is specifically configured to:

send a measurement period to the at least one second service station, so that the at least one second service station performs the service transmission status measurement for the user equipment by using the measurement period as a period, and uses a result obtained through the measurement as a measurement result for the user equipment; or so that the at least one second service station instructs the user equipment to perform the service transmission status measurement by using the measurement period as a period, receives a measurement result that is reported by the user equipment after the measurement, and uses the measurement result as a measurement result for the user equipment.

Optionally, the I/O apparatus 902 is further configured to: after instructing the at least one second service station to perform the service transmission status measurement for the user equipment, receive a measurement result returned by one second service station; and the processor 901 is further configured to determine a final measurement result for the user equipment according to the measurement result received by the I/O apparatus 902; or the I/O apparatus 902 is further configured to: after instructing the at least one second service station to perform the service transmission status measurement for the user equipment, receive measurement results returned by at least two second service stations; and the processor 901 is further configured to: merge the measurement results received by the I/O apparatus, and then determine a final measurement result for the user equipment according to a merging result; or the I/O apparatus 902 is further configured to: after instructing the at least one second service station to perform the service transmission status measurement for the user equipment, receive a measurement result returned by the at least one second service station; and the processor 901 is further configured to: merge a service transmission status measurement result, determined by the processor 901, for the user equipment and the measurement result received by the I/O apparatus 902, and then determine a final measurement result for the user equipment according to a merging result.

Optionally, the I/O apparatus 902 is further configured to: after instructing the at least one second service station to perform the service transmission status measurement for the user equipment, receive a measurement result returned by one second service station; and the processor 901 is further configured to determine a final measurement result for the user equipment according to the measurement result received by the I/O apparatus 902; or the I/O apparatus 902 is further configured to: after instructing the at least one second service station to perform the service transmission status measurement for the user equipment, receive measurement results returned by at least two second service stations; and the processor 901 is further configured to: merge measurement results corresponding to a same measurement time in the measurement results received by the I/O apparatus 902, and then determine a final measurement result for the user equipment according to a merging result; or the I/O apparatus 902 is further configured to: after instructing the at least one second service station to perform the service transmission status measurement for the user equipment, receive a measurement result returned by the at least one second service station; and the processor 901 is further configured to: merge measurement results corresponding to a same measurement time in the measurement result received by the I/O apparatus 902, and then determine a final measurement result for the user equipment according to a merging result.

Optionally, the I/O apparatus 902 is further configured to: after the processor 901 determines the final measurement result for the user equipment, report the final measurement result to a trace collection entity TCE.

Optionally, the I/O apparatus 902 is specifically configured to:

report information about a particular cell together with the final measurement result to the TCE, where the particular cell is a serving cell managed by a particular service station and used by the user equipment, where the particular service station includes one or more service stations in the at least one second service station corresponding to the measurement result, or one or more service stations in the service station and the at least one second service station that correspond to the measurement result.

Optionally, the I/O apparatus 902 is specifically configured to:

report particular indication information together with the final measurement result to the TCE, where the particular indication information is used for indicating whether the final measurement result is related to a status of service data transmission that the user equipment transmits the first data packet on the service station.

Optionally, the I/O apparatus 902 is further configured to:

receive a measurement result returned by the second service station, and report the measurement result to a TCE.

Optionally, the I/O apparatus 902 is further configured to:

send, to the at least one second service station, device identification information used for identifying a TCE and measurement identification information used for identifying the service transmission status measurement performed for the user equipment, so that after determining a measurement result for the user equipment, the at least one second service station reports the determined measurement result together with the measurement identification information to the TCE identified by the device identification information.

Optionally, the processor 901 is further configured to:

after the I/O apparatus 902 receives a notification message, for instructing to activate the measurement, of a measurement trigger device, acquire the device identification information and the measurement identification information from the notification message received by the I/O apparatus 902.

Optionally, the I/O apparatus 902 is further configured to:

send, to a particular core network, the received second data packet that is sent by the user equipment to the particular core network by using the second service station; and send, to the user equipment by using the second service station, the received second data packet that is sent by the particular core network to the user equipment, where the particular core network is a core network that transmits the second data packet for the user equipment.

Optionally, the service transmission status measurement includes any one of the following types of measurement:

traffic measurement, throughput measurement, delay measurement, and service burst pattern measurement for acquiring service burst information.

Optionally, the service burst information includes at least one of the following information:

a start time of a service burst;

an end time of the service burst;

duration of the service burst;

traffic or a throughput of a service during the service burst; and traffic or a throughput of the service in the last TTI of the service burst.

Figure 10:
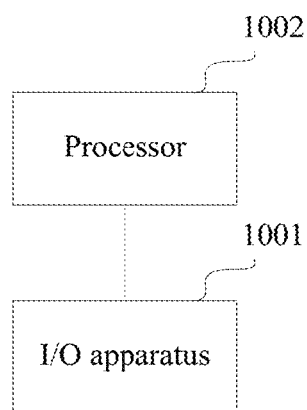
FIG. 10 is a schematic structural diagram of a fifth service station according to an embodiment of the present invention.

FIG. 10 is a schematic structural diagram of a fifth service station according to an embodiment of the present invention. As shown in FIG. 10, the service station includes:

an I/O apparatus 1001, configured to transmit a second data packet for a user equipment, and receive a measurement notification for performing service transmission status measurement for the user equipment, which is sent by a first service station that transmits a first data packet for the user equipment; and a processor 1002, configured to perform the service transmission status measurement for the user equipment according to the measurement notification received by the I/O apparatus 1001.

Optionally, the I/O apparatus 1001 is further configured to:

after the processor 1002 determines a measurement result for the user equipment, report the measurement result to a trace collection entity TCE or the first service station.

Optionally, the I/O apparatus 1001 reports the measurement result to the TCE, and the processor 1002 is further configured to:

acquire, from the measurement notification, device identification information used for identifying the TCE and measurement identification information used for identifying the service transmission status measurement performed for the user equipment, and determine the TCE according to the device identification information; and the I/O apparatus 1001 is specifically configured to report the measurement result together with the measurement identification information to the TCE.

Optionally, the I/O apparatus 1001 reports the measurement result to the TCE, and the I/O apparatus 1001 is specifically configured to report information about a particular cell together with the measurement result to the TCE; and the I/O apparatus 1001 reports the measurement result to the first service station, and the I/O apparatus 1001 is specifically configured to report information about a particular cell together with the measurement result to the first service station, where the particular cell is a serving cell managed by the service station and used by the user equipment.

Optionally, the I/O apparatus 1001 is further configured to:

send, to a particular core network by using the first service station, the received second data packet that is sent by the user equipment to the particular core network; and send, to the user equipment, the received second data packet that is sent by the particular core network to the user equipment and that is forwarded by the first service station, where the particular core network is a core network that transmits the second data packet for the user equipment.

Optionally, the service transmission status measurement includes any one of the following types of measurement:

traffic measurement, throughput measurement, delay measurement, and service burst pattern measurement for acquiring service burst information.

Optionally, the service burst information includes at least one of the following information:

a start time of a service burst;
an end time of the service burst;
duration of the service burst;

traffic or a throughput of a service during the service burst; and traffic or a throughput of the service in the last TTI of the service burst.

Figure 11:
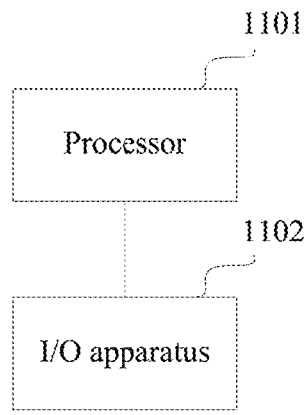
FIG. 11 is a schematic structural diagram of a third user equipment according to an embodiment of the present invention.

FIG. 11 is a schematic structural diagram of a third user equipment according to an embodiment of the present invention. As shown in the FIG. 11, the user equipment includes:

an I/O apparatus 1102, configured to transmit a first data packet for a first service station, and transmit a second data packet for at least one second service station; and a processor 1101, configured to determine a final service transmission status measurement result according to a status of data transmission that the user equipment transmits the first data packet on the first service station and a status of data transmission that the user equipment transmits the second data packet on the at least one second service station, where the I/O apparatus 1102 is further configured to report the final measurement result to the first service station, where the first data packet and the second data packet are different data packets of a same service of the user equipment or data packets of different services.

Optionally, the I/O apparatus 1102 is further configured to: before the processor 1101 determines the final measurement result, receive a notification message, for performing service transmission status measurement, of the first service station.

Optionally, the processor 1101 is specifically configured to:

determine, according to the status of data transmission that the user equipment transmits the first data packet on the first service station, a service transmission status measurement result corresponding to the first service station; and determine, according to a status of data transmission that the user equipment transmits the second data packet on each service station in the at least one second service station, a service transmission status measurement result corresponding to the second service station; and merge the determined service transmission status measurement result corresponding to the first service station and service transmission status measurement result corresponding to each service station in the at least one second service station, to obtain the final measurement result.

Alternatively, the processor 1101 is specifically configured to:

determine, for each service in services on which the service transmission status measurement needs to be performed, a final measurement result corresponding to the service.

Optionally, the processor 1101 is specifically configured to:

for each service in the services on which the service transmission status measurement needs to be performed, determine, according to a data transmission status of the service when the user equipment transmits the first data packet on the first service station, a service transmission status measurement result, corresponding to the first service station, for the service;

for each service in the services on which the service transmission status measurement needs to be performed, determine, by the user equipment according to a data transmission status of the service when the user equipment transmits the second data packet on each service station in the at least one second service station, a service transmission status measurement result, corresponding to the service station, for the service; and merge the determined service transmission status measurement result, corresponding to the first service station, for the service and service transmission status measurement result, corresponding to each service station in the at least one second service station, for the service, to obtain the final measurement result corresponding to the service.

Alternatively, the processor 1101 is specifically configured to:

when determining the final measurement result, determine, according to a data transmission status on each third service station that needs to perform the service transmission status measurement, a final measurement result corresponding to the service station, where the third service station is some or all service stations in the first service station and the at least one second service station.

Optionally, the I/O apparatus 1102 is specifically configured to:

when reporting the final measurement result, report, for each third service station that needs to perform the service transmission status measurement, information about a particular cell together with the determined final measurement result corresponding to the service station, where the particular cell is a serving cell used by the user equipment and managed by the service station that needs to perform the measurement.

Optionally, the I/O apparatus 1102 is further configured to:

transmit data with a particular core network, where the particular core network is a core network currently communicating with the user equipment, where the second data packet sent by the I/O apparatus 1102 to the particular core network by using the at least one second service station is forwarded by the first service station to the particular core network; and the second data packet that is sent by the particular core network to the user equipment and that is received by the I/O apparatus 1102 by using the at least one second service station is forwarded by the first service station to the second service station.

Optionally, the service transmission status measurement includes any one of the following types of measurement:

traffic measurement, throughput measurement, delay measurement, and service burst pattern measurement for acquiring service burst information.

Optionally, the service burst information includes at least one of the following information:

a start time of a service burst;
an end time of the service burst;
duration of the service burst;
traffic or a throughput of a service during the service burst; and
traffic or a throughput of the service in the last TTI of the service burst.

Figure 12:
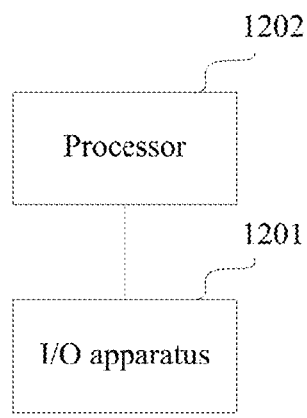
FIG. 12 is a schematic structural diagram of a sixth service station according to an embodiment of the present invention.

FIG. 12 shows a sixth service station according to an embodiment of the present invention. As shown in FIG. 12, the service station includes: an I/O apparatus 1201 and a processor 1202, where under the control of the processor 1202, the I/O apparatus 1201 transmits a first data packet for a user equipment, receives a service transmission status measurement result reported by the user equipment, and reports the measurement result to a trace collection entity TCE, where the measurement result is determined by the user equipment according to a status of data transmission that the user equipment transmits the first data packet on the service station and a status of data transmission that the user equipment transmits a second data packet on at least one second service station; and the first data packet and the second data packet are different data packets of a same service of the user equipment or data packets of different services.

Optionally, the processor 1202 is further configured to: after the I/O apparatus 1201 receives the measurement result, before the I/O apparatus 1201 sends the measurement result to the TCE, determine that the measurement result is a measurement result for a service currently performed by the user equipment, and determine whether the user equipment uses the first service station to transmit the service; and the I/O apparatus 1201 is specifically configured to send, to the TCE, the measurement result together with information used for indicating whether the user equipment uses the first service station to transmit the service.

Optionally, the processor 1202 is further configured to: after the I/O apparatus 1201 receives the measurement result, before the I/O apparatus 1201 sends the measurement result to the TCE, determine that the measurement result is determined by the user equipment according to a status of data transmission that the user equipment transmits the second data packet on one second service station, and determine information about a particular cell; and the I/O apparatus 1201 is specifically configured to send the measurement result together with the information about the particular cell to a TCE, where the particular cell is a serving cell managed by the second service station and used by the user equipment.

Optionally, the I/O apparatus 1201 is further configured to send, to a particular core network, the received second data packet that is sent by the user equipment to the particular core network and that is forwarded by the at least one second service station; and send, to the user equipment by using the at least one second service station, the received second data packet that is sent by the particular core network to the user equipment, where the particular core network is a core network currently communicating with the user equipment.

Optionally, the service transmission status measurement includes any one of the following types of measurement:

traffic measurement, throughput measurement, delay measurement, and service burst pattern measurement for acquiring service burst information.

Optionally, the service burst information includes at least one of the following information:

a start time of a service burst;
an end time of the service burst;
duration of the service burst;
traffic or a throughput of a service during the service burst; and
traffic or a throughput of the service in the last TTI of the service burst.

Figure 13:
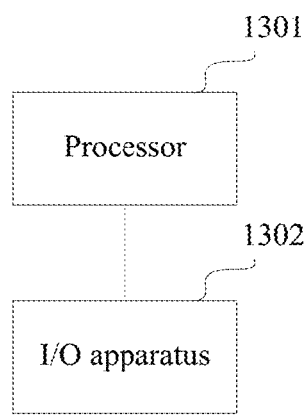
FIG. 13 is a schematic structural diagram of a fourth user equipment according to an embodiment of the present invention.

FIG. 13 is a schematic structural diagram of a fourth user equipment according to an embodiment of the present invention. As shown in the FIG. 13, the user equipment includes:

a processor 1301, configured to measure a value of a service burst parameter of a service for which data transmission is currently performed; and an I/O apparatus 1302, configured to report the service burst parameter value obtained by the processor 1301 through the measurement to a network side device having a wireless connection to the user equipment.

Optionally, the I/O apparatus 1302 is further configured to:

before the processor 1301 measures the service burst parameter of the service, receive a notification message, for instructing to report the service burst parameter of the service, of the network side device.

Optionally, the service burst parameter includes one or more of the following parameters:
a start time of a service burst;
an end time of the service burst;
duration of the service burst;
traffic or a throughput of a service during the service burst; and
traffic or a throughput of the service in the last TTI of the service burst.

Figure 14:
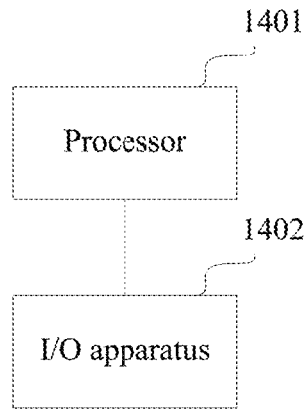
FIG. 14 is a schematic structural diagram of a second network side device according to an embodiment of the present invention.

FIG. 14 shows a second network side device according to an embodiment of the present invention. As shown in FIG. 14, the network side device includes:
a processor 1401, configured to measure a value of a service burst parameter of a service for which data transmission is currently performed; and
an I/O apparatus 1402, configured to report the service burst parameter value obtained by the processor 1401 through the measurement to an upper-layer network side device.

Optionally, the I/O apparatus 1402 is further configured to: before the processor 1401 measures the service burst parameter of the service, receive a notification message, for instructing to report the service burst parameter of service, of the upper-layer network side device.

Optionally, the service burst parameter includes one or more of the following parameters:
a start time of a service burst;
an end time of the service burst;
duration of the service burst;
traffic or a throughput of a service during the service burst; and
traffic or a throughput of the service in the last TTI of the service burst.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the other programmable device provide steps for implementing a specific function in one or more processes in the flowcharts and/or in one or more blocks in the block diagrams.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A method for measuring a service transmission status of a user equipment, comprising:
   transmitting, by a first service station, a first data packet for the user equipment;
   determining, by the first service station, at least one second service station that transmits a second data packet for the user equipment; and
   sending, by the first service station to the at least one second service station, device identification information used for identifying a trace collection entity (TCE) and measurement identification information used for identifying a service transmission status measurement performed for the user equipment, wherein after determining a measurement result for the user equipment, the at least one second service station reports the determined measurement result together with the measurement identification information to the TCE identified by the device identification information, and
   wherein the first data packet and the second data packet are different data packets of a same service of the user equipment or data packets of different services.

2. The method according to claim 1, wherein the method further comprises:
   after receiving a notification message, for instructing to activate the measurement, of a measurement trigger device, acquiring, by the first service station, the device identification information and the measurement identification information from the received notification message.

3. The method according to claim 1, wherein the method further comprises:
   sending, by the first service station to a particular core network, the received second data packet that is sent by the user equipment to the particular core network by using the second service station; and
   sending, by the first service station to the user equipment by using the second service station, the received second data packet that is sent by the particular core network to the user equipment,
   wherein the particular core network is a core network that transmits the second data packet for the user equipment.

4. The method according to claim 1, wherein after the sending by the first service station, device identification information and measurement identification information, the method further comprises:
- determining, by the first service station, a final measurement result for the user equipment according to a received measurement result returned by one second service station; or
- merging, by the first service station, received measurement results returned by at least two second service stations, and determining the final measurement result for the user equipment according to a merging result; or
- merging, by the first service station, a determined service transmission status measurement result for the user equipment and a received measurement result returned by the at least one second service station, and determining the final measurement result for the user equipment according to the merging result.

5. A service station, wherein the service station comprises:
- a transceiver configured to transmit a first data packet for a user equipment; and
- a processor configured to determine at least one second service station that transmits a second data packet for the user equipment,
- wherein the transceiver is further configured to send, to the at least one second service station, device identification information used for identifying a trace collection entity (TCE) and measurement identification information used for identifying a service transmission status measurement performed for the user equipment, wherein after determining a measurement result for the user equipment, the at least one second service station reports the determined measurement result together with the measurement identification information to the TCE identified by the device identification information, and
- wherein the first data packet and the second data packet are different data packets of a same service of the user equipment or data packets of different services.

6. The service station according to claim 5, wherein the processor is further configured to:
- acquire the device identification information and the measurement identification information from the notification message received by the transceiver.

7. The service station according to claim 5, wherein the transceiver is further configured to:
- send, to a particular core network, the received second data packet that is sent by the user equipment to the particular core network by using the second service station; and
- send, to the user equipment by using the second service station, the received second data packet that is sent by the particular core network to the user equipment, wherein
- the particular core network is a core network that transmits the second data packet for the user equipment.

8. The service station according to claim 5, wherein the processor is further configured to:
- determine a final measurement result for the user equipment according to a received measurement result returned by one second service station; or
- merge received measurement results returned by at least two second service stations, and then determining the final measurement result for the user equipment according to a merging result; or
- merge a determined service transmission status measurement result for the user equipment and a received measurement result returned by the at least one second service station, and then determining the final measurement result for the user equipment according to the merging result.

\* \* \* \* \*